United States Patent
Yang et al.

(10) Patent No.: US 9,713,806 B2
(45) Date of Patent: Jul. 25, 2017

(54) HYDROTREATING CATALYST, PRODUCTION AND USE THEREOF

(71) Applicants: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

(72) Inventors: Zhanlin Yang, Liaoning (CN); Hong Jiang, Liaoning (CN); Zhaoji Tang, Liaoning (CN); Jifeng Wang, Liaoning (CN); Derong Wen, Liaoning (CN); Dengling Wei, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

( * ) Notice: Subject to any disclaimer, the term of this patent is extended or adjusted under 35 U.S.C. 154(b) by 113 days.

(21) Appl. No.: 14/441,806

(22) PCT Filed: Oct. 31, 2013

(86) PCT No.: PCT/CN2013/001319
§ 371 (c)(1),
(2) Date: May 8, 2015

(87) PCT Pub. No.: WO2014/071686
PCT Pub. Date: May 15, 2014

(65) Prior Publication Data
US 2015/0306579 A1    Oct. 29, 2015

(30) Foreign Application Priority Data

Nov. 8, 2012 (CN) .......................... 2012 1 0442653
Nov. 8, 2012 (CN) .......................... 2012 1 0442850
Nov. 8, 2012 (CN) .......................... 2012 1 0443119

(51) Int. Cl.
*C10G 45/08* (2006.01)
*C10G 45/04* (2006.01)
(Continued)

(52) U.S. Cl.
CPC ............. *B01J 27/19* (2013.01); *B01J 23/881* (2013.01); *B01J 23/882* (2013.01); *B01J 23/883* (2013.01);
(Continued)

(58) Field of Classification Search
CPC ...... B01J 23/881; B01J 23/882; B01J 23/883; B01J 27/00; B01J 27/19; B01J 31/04;
(Continued)

(56) References Cited

U.S. PATENT DOCUMENTS

| 4,411,824 A | * | 10/1983 | Chen ........................ B01J 23/85 208/251 H |
| 4,760,045 A | | 7/1988 | Oishi et al. |
| 2008/0146438 A1 | * | 6/2008 | Bai ........................ C10G 45/08 502/173 |

FOREIGN PATENT DOCUMENTS

| CN | 1229835 A | 9/1999 |
| CN | 1289828 A | 4/2001 |

(Continued)

OTHER PUBLICATIONS

Pinna, F. (1998) Catalysis Today, 41, 129-137.*

*Primary Examiner* — Brian McCaig
(74) *Attorney, Agent, or Firm* — Novick, Kim & Lee, PLLC; Allen Xue

(57) ABSTRACT

This invention relates to a hydrotreating catalyst suitable for heavy distillate oil hydrodesulfurization, production and use thereof. The present hydrotreating catalyst exhibits significantly improved heavy distillate oil (deep) hydrodesulfurization activity.

30 Claims, 3 Drawing Sheets

Figure 1A:
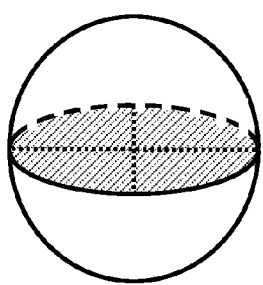

(51) Int. Cl.
*B01J 27/19* (2006.01)
*B01J 23/881* (2006.01)
*B01J 23/882* (2006.01)
*B01J 23/883* (2006.01)
*C10G 45/02* (2006.01)
*B01J 35/10* (2006.01)
B01J 27/00 (2006.01)
B01J 31/04 (2006.01)

(52) U.S. Cl.
CPC .......... *B01J 35/1019* (2013.01); *C10G 45/02* (2013.01); *C10G 45/04* (2013.01); *C10G 45/08* (2013.01); *B01J 31/04* (2013.01); *C10G 2300/107* (2013.01); *C10G 2300/1074* (2013.01); *C10G 2300/1077* (2013.01)

(58) Field of Classification Search
CPC ...... B01J 35/1019; C10G 45/02; C10G 45/04; C10G 45/08; C10G 2300/107; C10G 2300/1074; C10G 2300/1077
See application file for complete search history.

(56) References Cited

FOREIGN PATENT DOCUMENTS

| | | | |
|---|---|---|---|
| CN | 101279289 A | 10/2008 | |
| CN | 101279291 A | 10/2008 | |
| CN | 101439293 A | 5/2009 | |

\* cited by examiner

HYDROTREATING CATALYST, PRODUCTION AND USE THEREOF

TECHNICAL FIELD

This invention relates to a hydrotreating catalyst, especially to a hydrotreating catalyst suitable for heavy distillate oil (especially diesel oil) hydrodesulfurization. This invention further relates to a process for producing the hydrotreating catalyst and use thereof in heavy distillate oil hydrodesulfurization (especially deep hydrodesulfurization) as a hydrodesulfurization catalyst.

BACKGROUND ART

As the haze pollution issue is getting more and more severe at present, vehicle exhaust is gaining more and more attention. It is reported that the diesel vehicle may be responsible for this issue to the most extent. Then, to reduce the haze pollution, one out of the key factors is to improve the product standard of diesel oil, whereby rendering the diesel oil deep hydrodesulfurization technology more and more important under the current situation.

Sulfur-containing compounds in diesel oil mainly include fatty sulfides, thioethers, dibenzothiophenes, alkyl benzothiophenes and alkyl dibenzothiophenes, wherein thiophenes like dibenzothiophenes, alkyl benzothiophenes and alkyl dibenzothiophenes (hereinafter collectively referred to as hardly desulfurizating compound) are relatively difficult to be removed, and among them, thiophenes characterized by a complicate chemical structure and significant steric hindrance like 4,6-dimethyl dibenzothiophene and 2,4,6-trimethyl dibenzothiophene, are most difficult to be removed. Diesel oil deep hydrodesulfurization mainly intends to remove these hardly desulfurizating compounds, however, these hardly desulfurizating compounds, if with a conventional hydrodesulfurization technology, are hardly to be removed even at elevated temperatures and pressures. For this reason, a diesel oil hydrodesulfurization (especially deep hydrodesulfurization) technology may have to be based on a reaction mechanism significantly different from the conventional hydrodesulfurization, which necessitates specially designing a diesel oil hydrodesulfurization catalyst.

In addition to diesel oil, other heavy distillate oils need a similar deep hydrodesulfurization as well.

Chinese patent CN99103007.9 discloses a hydrotreating catalyst, comprising $WO_3$ and/or $MoO_3$, NiO and CoO supported onto an alumina carrier. The catalyst contains a relatively lower amount of metal but exhibits a relatively high activity at lowered temperatures, especially suitable for hydrodesulfurization of light-end products.

Chinese patent CN99113281.5 discloses a hydrotreating catalyst, which comprises alumina or silica-containing alumina as the carrier, and W, Mo, Ni as the active components, and further phosphorus as an auxiliary component. The catalyst exhibits a significantly high hydrodenitrification activity.

The prior art hydrotreating catalysts have been identified as conventional hydrodesulfurization catalyst, and therefore can not be effectively used for the hydrodesulfurization of heavy distillate oils (especially diesel oil). Therefore, there remains a need in the prior art for a hydrotreating catalyst, which is especially suitable for the hydrodesulfurization (especially deep hydrodesulfurization) of heavy distillate oils (especially diesel oil).

INVENTION SUMMARY

The present inventors, on the basis of the prior art, found that if the concentration distribution of an active metal component in the particle of a hydrotreating catalyst meets some specific requirement, it is possible to provide the hydrotreating catalyst with significantly improved heavy distillate oil (deep) hydrodesulfurization activity, and the aforesaid problems in association with the prior art can be solved, whereby this invention is achieved.

Specifically, this invention relates to the following aspects.

1. A hydrotreating catalyst, which is in a particulate form, and comprises a porous refractory carrier (preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, further preferably alumina) and an active metal component A, an active metal component B, an active metal component C and optionally an auxiliary component supported on the porous refractory carrier, the active metal component A is Ni, the active metal component B is one or more selected from the group consisting of Group VIII metals other than Ni in the element periodic table, preferably one or more selected from the group consisting of Group VIII non-noble metals other than Ni in the element periodic table, more preferably Co, the active metal component C is one or more selected from the group consisting of Group VIB metals in the element periodic table, preferably one or more selected from the group consisting of Mo and W, more preferably Mo, the auxiliary component is one or more selected from the group consisting of fluorine, silicon, phosphorus, titanium, zirconium and boron, preferably one or more selected from the group consisting of fluorine and phosphorus, more preferably phosphorus, wherein, the concentration distribution of the active metal component A meets the following condition (I) or (II), Condition (I): throughout the cross-section of each individual catalyst particle, the concentration thereof substantially uniformly distributes, Condition (II): throughout the cross-section of each individual catalyst particle, the concentration thereof meets the following formulas (1) and (2) at the same time:

$C^A_{out} > C^A_{1/2} > 1$, preferably $C^A_{out} > C^A_{1/4} > C^A_{1/2} > C^A_{3/4} > 1$, more preferably $C^A_{out} > C^A_{opt} > 1$, more preferably $C^A_{out}/C^A_{1/2} = 1.5$-$2.6$, preferably $1.7$-$2.5$, further preferably $C^A_{out}/C^A_{1/4} = 1.2$-$1.8$, preferably $1.3$-$1.7$, further preferably $C^A_{1/4}/C^A_{1/2} = 1.1$-$1.7$, preferably $1.2$-$1.6$,      Formula (1)

$C^A_{out} \geq 1.5$, preferably $C^A_{out} \geq 2.0$, more preferably $C^A_{out} \geq 2.4$, but $C^A_{out} \leq 5.0$, preferably $C^A_{out} \leq 4.0$,      Formula (2)

wherein the symbol $C^A_{out}$ represents the ratio of the concentration of the active metal component A at an arbitrary position point $P_A$ on the outmost edge of the cross-section of the catalyst particle to the concentration of the active metal component A at the central point on the cross-section of the catalyst particle, and assuming that the length value of the line segment connecting the central point and the position point $P_A$ on the cross-section of the catalyst particle is $L_A$, the symbol $C^A_{1/2}$ represents the ratio of the concentration of the active metal component A at the position point on the line segment ($\frac{1}{2}$)$L_A$ away from the position point $P_A$ to the concentration of the active metal component A at the central point on the cross-section of the catalyst particle, the symbol $C^A_{1/4}$ represents the ratio of the concentration of the active metal component A at the position point on the line segment $(1/4)L_A$ away from the position point $P_A$ to the concentration of the active metal component A at the central point on the cross-section of the catalyst particle, the symbol $C^A_{3/4}$ represents the ratio of the concentration of the active metal component A at the position point on the line segment $(3/4)L_A$ away from the position point $P_A$ to the concentration of the active metal component A at the central point on the cross-section of the catalyst particle, the symbol $C^A_{opt}$ represents the ratio of the concentration of the active metal component A at an arbitrary position point on the line segment (not including the central point and the position point $P_A$) to the concentration of the active metal component A at the central point on the cross-section of the catalyst particle, and, the concentration distribution of the active metal component B meets the following condition (III) or (IV), Condition (III): throughout the cross-section of each individual catalyst particle, the concentration thereof substantially uniformly distributes.

Condition (IV): throughout the cross-section of each individual catalyst particle, the concentration thereof meets the following formulas (3) and (4) at the same time:

$$C^B_{out} < C^B_{1/2} < 1, \text{ preferably } C^B_{out} < C^B_{1/4} < C^B_{1/2} < C^B_{3/4} < 1, \text{ more preferably } C^B_{out} < C^B_{opt} < 1, \text{ more preferably } C^B_{out}/C^B_{1/2} = 0.2\text{-}0.8, \text{ preferably } 0.2\text{-}0.7, \text{ further preferably } C^B_{out}/C^B_{1/4} = 0.3\text{-}0.9, \text{ preferably } 0.3\text{-}0.85, \text{ further preferably } C^B_{1/4}/C^B_{1/2} = 0.4\text{-}0.9, \text{ preferably } 0.4\text{-}0.87,$$ Formula (3)

$$C^B_{out} \leq 0.80, \text{ preferably } C^B_{out} \leq 0.70, \text{ preferably } C^B_{out} \leq 0.68, \text{ preferably } C^B_{out} \leq 0.60, \text{ but } C^B_{out} \geq 0.10, \text{ preferably } C^B_{out} \geq 0.20,$$ Formula (4)

wherein the symbol $C^B_{out}$ represents the ratio of the concentration of the active metal component B at an arbitrary position point $P_B$ on the outmost edge of the cross-section of the catalyst particle to the concentration of the active metal component B at the central point on the cross-section of the catalyst particle, and assuming that the length value of the line segment connecting the central point and the position point $P_B$ on the cross-section of the catalyst particle is $L_B$, the symbol $C^B_{1/2}$ represents the ratio of the concentration of the active metal component B at the position point on the line segment $(1/2)L_B$ away from the position point $P_B$ to the concentration of the active metal component B at the central point on the cross-section of the catalyst particle, the symbol $C^B_{1/4}$ represents the ratio of the concentration of the active metal component B at the position point on the line segment $(1/4)L_B$ away from the position point $P_B$ to the concentration of the active metal component B at the central point on the cross-section of the catalyst particle, the symbol $C^B_{3/4}$ represents the ratio of the concentration of the active metal component B at the position point on the line segment $(3/4)L_B$ away from the position point $P_B$ to the concentration of the active metal component B at the central point on the cross-section of the catalyst particle, the symbol $C^B_{opt}$ represents the ratio of the concentration of the active metal component B at an arbitrary position point on the line segment (not including the central point and the position point $P_B$) to the concentration of the active metal component B at the central point on the cross-section of the catalyst particle, with the proviso that, the concentration distribution of the active metal component A and the concentration distribution of the active metal component B do not meet the conditions (I) and (III) at the same time, preferably, the concentration distribution of the active metal component A meets the condition (II), and at the same time, the concentration distribution of the active metal component B meets the condition (IV).

2. The hydrotreating catalyst according to the preceding aspect, having a specific surface area (by the BET method) of 100-260 m²/g, preferably 120-220 m²/g, and a pore volume (by the BET method) of 0.20-0.60 ml/g, preferably 0.20-0.50 ml/g.

3. The hydrotreating catalyst according to any one of the preceding aspects, wherein the content of the porous refractory carrier is 45-89 wt %, 46-87 wt % or 55-85 wt %, preferably the remaining; the content of the active metal component A (as NiO) is 1-8 wt %; the content of the active metal component B (as the corresponding oxide, for example, Co as CoO) is at least 0.5 wt %, 1 wt % or 1.5 wt %, at most 6 wt % or 8 wt %; the content of the active metal component C (as the corresponding oxide) is 6-60 wt %, preferably 6-40 wt %, especially the content of Mo (as $MoO_3$) is at least 6 wt %, 8 wt % or 10 wt %, at most 26 wt %, 32 wt % or 40 wt %, and/or, the content of W (as $WO_3$) is 6-28 wt %; and the content of the auxiliary component (as the corresponding element) is 30 wt % or less, preferably 20 wt % or less, especially the content of phosphorus (as $P_2O_5$) is 1-6 wt %, relative to the weight of the catalyst.

4. The hydrotreating catalyst according to any one of the preceding aspects, wherein the active metal component C is Mo, and the concentration distribution of Mo meets the following condition (V) or (VI), Condition (V): throughout the cross-section of each individual catalyst particle, the concentration thereof substantially uniformly distributes, Condition (VI): throughout the cross-section of each individual catalyst particle, the concentration thereof meets the following formulas (5) and (6) at the same time:

$$C^{Mo}_{out} < C^{Mo}_{1/2} < 1, \text{ preferably } C^{Mo}_{out} < C^{Mo}_{1/4} < C^{Mo}_{1/2} < C^{Mo}_{3/4} < 1, \text{ more preferably } C^{Mo}_{out} < C^{Mo}_{opt} < 1,$$ Formula (5)

$$0.08 \leq C^{Mo}_{out} \leq 0.70,$$ Formula (6)

wherein the symbol $C^{Mo}_{out}$ represents the ratio of the concentration of the active metal component Mo at an arbitrary position point $P_{Mo}$ on the outmost edge of the cross-section of the catalyst particle to the concentration of the active metal component Mo at the central point on the cross-section of the catalyst particle, and assuming that the length value of the line segment connecting the central point and the position point $P_{Mo}$ on the cross-section of the catalyst particle is $L_{Mo}$, the symbol $C^{Mo}_{1/2}$ represents the ratio of the concentration of the active metal component Mo at the position point on the line segment $(1/2)L_{Mo}$ away from the position point $P_{Mo}$ to the concentration of the active metal component Mo at the central point on the cross-section of the catalyst particle, the symbol $C^{Mo}_{1/4}$ represents the ratio of the concentration of the active metal component Mo at the position point on the line segment $(1/4)L_{Mo}$ away from the position point $P_{Mo}$ to the concentration of the active metal component Mo at the central point on the cross-section of the catalyst particle, the symbol $C^{Mo}_{3/4}$ represents the ratio of the concentration of the active metal component Mo at the position point on the line segment $(3/4)L_{Mo}$ away from the position point $P_{Mo}$ to the concentration of the active metal component Mo at the central point on the cross-section of the catalyst particle, the symbol $C^{Mo}_{opt}$ represents the ratio of the concentration of the active metal component Mo at an arbitrary position point on the line segment (not including the central point and the position point $P_{Mo}$) to the concentration of the active metal component Mo at the central point on the cross-section of the catalyst particle, or, the active metal component C is a combination of Mo and W, the concentration distribution of Mo meets the following condition (V) or (VI), while the concentration distribution of W meets the following condition (VII) or (VIII), Condition (V): throughout the cross-section of each individual catalyst particle, the concentration thereof substantially uniformly distributes, Condition (VI): throughout the cross-section of each individual catalyst particle, the concentration thereof meets the following formulas (5) and (6) at the same time:

$$C^{Mo}_{out} < C^{Mo}_{1/2} < 1, \text{ preferably } C^{Mo}_{out} < C^{Mo}_{1/4} < C^{Mo}_{1/2} < C^{Mo}_{3/4} < 1, \text{ more preferably}$$
$$C^{Mo}_{out} < C^{Mo}_{opt} < 1, \qquad \text{Formula (5)}$$

$$0.08 \leq C^{Mo}_{out} \leq 0.70, \qquad \text{Formula (6)}$$

wherein the symbol $C^{Mo}_{out}$ represents the ratio of the concentration of the active metal component Mo at an arbitrary position point $P_{Mo}$ on the outmost edge of the cross-section of the catalyst particle to the concentration of the active metal component Mo at the central point on the cross-section of the catalyst particle, and assuming that the length value of the line segment connecting the central point and the position point $P_{Mo}$ on the cross-section of the catalyst particle is $L_{Mo}$, the symbol $C^{Mo}_{1/2}$ represents the ratio of the concentration of the active metal component Mo at the position point on the line segment $(\frac{1}{2})L_{Mo}$ away from the position point $P_{Mo}$ to the concentration of the active metal component Mo at the central point on the cross-section of the catalyst particle, the symbol $C^{Mo}_{1/4}$ represents the ratio of the concentration of the active metal component Mo at the position point on the line segment $(\frac{1}{4})L_{Mo}$ away from the position point $P_{Mo}$ to the concentration of the active metal component Mo at the central point on the cross-section of the catalyst particle, the symbol $C^{Mo}_{3/4}$ represents the ratio of the concentration of the active metal component Mo at the position point on the line segment $(\frac{3}{4})L_{Mo}$ away from the position point $P_{Mo}$ to the concentration of the active metal component Mo at the central point on the cross-section of the catalyst particle, the symbol $C^{Mo}_{opt}$ represents the ratio of the concentration of the active metal component Mo at an arbitrary position point on the line segment (not including the central point and the position point $P_{Mo}$) to the concentration of the active metal component Mo at the central point on the cross-section of the catalyst particle, Condition (VII): throughout the cross-section of each individual catalyst particle, the concentration thereof substantially uniformly distributes, Condition (VIII): throughout the cross-section of each individual catalyst particle, the concentration thereof meets the following formulas (7) and (8) at the same time:

$$C^{W}_{out} > C^{W}_{1/2} > 1, \text{ preferably } C^{W}_{out} > C^{W}_{1/4} > C^{W}_{1/2} > C^{W}_{3/4} > 1, \text{ more preferably}$$
$$C^{W}_{out} > C^{W}_{opt} > 1, \qquad \text{Formula (7)}$$

$$7.0 \geq C^{W}_{out} \geq 1.2, \qquad \text{Formula (8)}$$

wherein the symbol $C^{W}_{out}$ represents the ratio of the concentration of the active metal component W at an arbitrary position point $P_W$ on the outmost edge of the cross-section of the catalyst particle to the concentration of the active metal component W at the central point on the cross-section of the catalyst particle, and assuming that the length value of the line segment connecting the central point and the position point $P_W$ on the cross-section of the catalyst particle is $L_W$, the symbol $C^{W}_{1/2}$ represents the ratio of the concentration of the active metal component W at the position point on the line segment $(\frac{1}{2})L_W$ away from the position point $P_W$ to the concentration of the active metal component W at the central point on the cross-section of the catalyst particle, the symbol $C^{W}_{1/4}$ represents the ratio of the concentration of the active metal component W at the position point on the line segment $(\frac{1}{4})L_W$ away from the position point $P_W$ to the concentration of the active metal component W at the central point on the cross-section of the catalyst particle, the symbol $C^{W}_{3/4}$ represents the ratio of the concentration of the active metal component W at the position point on the line segment $(\frac{3}{4})L_W$ away from the position point $P_W$ to the concentration of the active metal component W at the central point on the cross-section of the catalyst particle, the symbol $C^{W}_{opt}$ represents the ratio of the concentration of the active metal component W at an arbitrary position point on the line segment (not including the central point and the position point $P_W$) to the concentration of the active metal component W at the central point on the cross-section of the catalyst particle.

5. The hydrotreating catalyst according to any one of the preceding aspects, wherein according to the formula (1), on the cross-section of each individual catalyst particle, the concentration of the active metal component A along the line segment from the position point $P_A$ to the central point substantially gradually decreases, it is preferable to meet the formula (1'), with the proviso that when the calculated value of the relation $(d2_A - d1_A)/L_A$ is 5% or less (preferably 2% or less, more preferably 1% or less, more preferably 0.5% or less), $C^{A}_{opt-1} > 90\% \ C^{A}_{opt-2}$ (preferably $C^{A}_{opt-1} > 95\% \ C^{A}_{opt-2}$, more preferably $C^{A}_{opt-1} > 98\% \ C^{A}_{opt-2}$) holds, it is more preferably that the formula (1) is the following formula (1'), $$C^{A}_{out} > C^{A}_{opt-1} > C^{A}_{opt-2} > 1, \qquad \text{Formula (1')}$$

wherein the symbol $C^{A}_{opt-1}$ represents the ratio of the concentration of the active metal component A at an arbitrary position point opt-1 on the line segment (not including the position point $P_A$ and the central point) to the concentration of the active metal component A at the central point on the cross-section of the catalyst particle, the symbol $C^{A}_{opt-2}$ represents the ratio of the concentration of the active metal component A at an arbitrary position point opt-2 on the line segment (not including the position point $P_A$ and the central point) to the concentration of the active metal component A at the central point on the cross-section of the catalyst particle, and assuming that the linear distance between the position point $P_A$ and the position point opt-1 is $d1_A$ in value, while the linear distance between the position point $P_A$ and the position point opt-2 is $d2_A$ in value, then $d1_A/d2_A < 1$, or, according to the formula (3), on the cross-section of each individual catalyst particle, the concentration of the active metal component B along the line segment from the position point $P_B$ to the central point substantially gradually increases, it is preferable to meet the formula (3'), with the proviso that when the calculated value of the relation $(d2_B - d1_B)/L_B$ is 5% or less (preferably 2% or less, more preferably 1% or less, more preferably 0.5% or less), $C^{B}_{opt-1} < 110\% \ C^{B}_{opt-2}$ (preferably $C^{B}_{opt-1} < 105\% \ C^{B}_{opt-2}$, more preferably $C^{B}_{opt-1} < 102\% \ C^{B}_{opt-2}$) holds, it is more preferably that the formula (3) is the following formula (3'), $$C^{B}_{out} < C^{B}_{opt-1} < C^{B}_{opt-2} < 1, \qquad \text{Formula (3')}$$

wherein the symbol $C^{B}_{opt-1}$ represents the ratio of the concentration of the active metal component B at an arbitrary position point opt-1 on the line segment (not including the position point $P_B$ and the central point) to the concentration of the active metal component B at the central point on the cross-section of the catalyst particle, the symbol $C^B_{opt-2}$ represents the ratio of the concentration of the active metal component B at an arbitrary position point opt-2 on the line segment (not including the position point $P_B$ and the central point) to the concentration of the active metal component B at the central point on the cross-section of the catalyst particle, and assuming that the linear distance between the position point $P_B$ and the position point opt-1 is $d1_B$ in value, while the linear distance between the position point $P_B$ and the position point opt-2 is $d2_B$ in value, then $d1_B/d2_B<1$.

6. The hydrotreating catalyst according to any one of the preceding aspects, wherein on the outmost surface of the catalyst particle, the ratio of the concentration of the active metal component A to the concentration of the active metal component C (preferably the ratio of the concentration of Ni to the concentration of Mo, the ratio of the concentration of Ni to the concentration of W or the ratio of the concentration of Ni to the concentration of (W+Mo)) is 0.22-0.80, preferably 0.30-0.70, and/or, at the central point of the catalyst particle, the ratio of the concentration of the active metal component B to the concentration of the active metal component C (preferably the ratio of the concentration of Co to the concentration of Mo) is 0.20-0.78, preferably 0.25-0.65.

7. A process for producing a hydrotreating catalyst, comprising at least the following steps:

(1-1) By unsaturated impregnation, onto a particulate porous refractory carrier (preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, further preferably alumina), an adsorbent I is supported, and optionally an organic alcohol having a carbon atom number of 1-5 (especially a monohydric alcohol or polyol, preferably one or more selected from the group consisting of ethylene glycol, propylene glycol, glycerin, pentaerythritol and xylitol) is simultaneously supported, wherein the adsorbent I is one or more selected from the group consisting of an organic carboxylic acid (especially a monohydric or polyhydric carboxylic acid, preferably a dihydric carboxylic acid) having a carbon atom number of 2-15 and an ammonium salt thereof, preferably one or more selected from the group consisting of acetic acid, oxalic acid, lactic acid, malonic acid, tartaric acid, malic acid, citric acid, trichloroacetic acid, monochloroacetic acid, mercaptoacetic acid, mercaptopropionic acid, ethylenediamine tetraacetic acid, nitrilotriacetic acid, diaminocyclohexane tetraacetic acid and ammonium salts thereof, the adsorbent I is used with an amount of 0.1-10 wt % relative to the amount of the porous refractory carrier, the organic alcohol is used with an amount of 0.1-10 wt % relative to the amount of the porous refractory carrier, (1-2) Onto the product obtained from the step (1-1), an active metal component B, optionally an active metal component C and optionally an auxiliary component are supported, wherein the active metal component B is one or more selected from the group consisting of Group VIII metals other than Ni in the element periodic table, preferably Co, the active metal component C is one or more selected from the group consisting of Group VIB metals in the element periodic table, preferably one or more selected from the group consisting of Mo and W, more preferably Mo, the auxiliary component is one or more selected from the group consisting of fluorine, silicon, phosphorus, titanium, zirconium and boron, preferably one or more selected from the group consisting of fluorine and phosphorus, more preferably phosphorus, and (1-3) Before the beginning of the step (1-1) and/or after the completion of the step (1-2), onto the porous refractory carrier, an active metal component A, optionally the active metal component C and optionally the auxiliary component are supported, wherein the active metal component A is Ni, with the proviso that the active metal component C is supported through at least one out of the step (1-2) and the step (1-3) (preferably through a combination of the step (1-2) and the step (1-3)), or, comprising at least the following steps:

(2-1) By saturated impregnation or oversaturated impregnation, onto a particulate porous refractory carrier (preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, further preferably alumina), an adsorbent II is supported, wherein the adsorbent II is a polyol having a number averaged molecular weight Mn (by the GPC method) of 400-10000, preferably a polyol having a number averaged molecular weight Mn (by the GPC method) of 1000-8000, more preferably polyether glycol (especially polyethylene glycol) having a number averaged molecular weight Mn (by the GPC method) of 1000-8000, the adsorbent II is used with an amount of 0.1-10 wt % relative to the amount of the porous refractory carrier;

(2-2) Onto the product obtained from the step (2-1), an active metal component A, optionally an active metal component C and optionally an auxiliary component are supported, wherein the active metal component A is Ni, the active metal component C is one or more selected from the group consisting of Group VIB metals in the element periodic table, preferably one or more selected from the group consisting of Mo and W, more preferably Mo, the auxiliary component is one or more selected from the group consisting of fluorine, silicon, phosphorus, titanium, zirconium and boron, preferably one or more selected from the group consisting of fluorine and phosphorus, more preferably phosphorus, and (2-3) Before the beginning of the step (2-1) and/or after the completion of the step (2-2), onto the porous refractory carrier, an active metal component B, optionally the active metal component C and optionally the auxiliary component are supported, wherein the active metal component B is one or more selected from the group consisting of Group VIII metals other than Ni in the element periodic table, preferably Co, with the proviso that the active metal component C is supported through at least one out of the step (2-2) and the step (2-3) (preferably through a combination of the step (2-2) and the step (2-3)), or, comprising at least the following steps:

(3-1) By unsaturated impregnation, onto a particulate porous refractory carrier (preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, further preferably alumina), an adsorbent I is supported, and optionally an organic alcohol having a carbon atom number of 1-5 (especially a monohydric alcohol or polyol, preferably one or more selected from the group consisting of ethylene glycol, propylene glycol, glycerin, pentaerythritol and xylitol) is simultaneously supported, wherein the adsorbent I is one or more selected from the group consisting of organic carboxylic acids having a carbon atom number of 2-15 (especially monohydric or polyhydric carboxylic acids, preferably dihydric carboxylic acids) and ammonium salts thereof, preferably one or more selected from the group consisting of acetic acid, oxalic acid, lactic acid, malonic acid, tartaric acid, malic acid, citric acid, trichloroacetic acid, monochloroacetic acid, mercaptoacetic acid, mercaptopropionic acid, ethylenediamine tetraacetic acid, nitrilotriacetic acid, diaminocyclohexane tetraacetic acid and ammonium salts thereof, the adsorbent I is used with an amount of 0.1-10 wt % relative to the amount of the porous refractory carrier, the organic alcohol is used with an amount of 0.1-10 wt % relative to the amount of the porous refractory carrier, (3-2) Onto the product obtained from the step (3-1), an active metal component B, optionally an active metal component C and optionally an auxiliary component are supported, wherein the active metal component B is one or more selected from the group consisting of Group VIII metals other than Ni in the element periodic table, preferably Co, the active metal component C is one or more selected from the group consisting of Group VIB metals in the element periodic table, preferably one or more selected from the group consisting of Mo and W, more preferably Mo, the auxiliary component is one or more selected from the group consisting of fluorine, silicon, phosphorus, titanium, zirconium and boron, preferably one or more selected from the group consisting of fluorine and phosphorus, more preferably phosphorus, (3-3) By saturated impregnation or oversaturated impregnation, onto the product obtained from the step (3-2), an adsorbent II is supported, wherein the adsorbent II is a polyol having a number averaged molecular weight Mn (by the GPC method) of 400-10000, preferably a polyol having a number averaged molecular weight Mn (by the GPC method) of 1000-8000, more preferably polyether glycol (especially polyethylene glycol) having a number averaged molecular weight Mn (by the GPC method) of 1000-8000, the adsorbent II is used with an amount of 0.1-10 wt % relative to the amount of the porous refractory carrier;

(3-4) Onto the product obtained from the step (3-3), an active metal component A, optionally the active metal component C and optionally the auxiliary component are supported, wherein the active metal component A is Ni, and (3-5) Optionally before the beginning of the step (3-1), after the completion of the step (3-2), while before the beginning of the step (3-3) and/or after the completion of the step (3-4), onto the porous refractory carrier, the active metal component C and optionally the auxiliary component are supported, with the proviso that the active metal component C is supported through at least one out of the step (3-2), the step (3-4) and the step (3-5) (preferably through a combination of the step (3-2) and the step (3-4)), or, comprising at least the following steps:

(4-1) By saturated impregnation or oversaturated impregnation, onto a particulate porous refractory carrier (preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, further preferably alumina), an adsorbent II is supported, wherein the adsorbent II is a polyol having a number averaged molecular weight Mn (by the GPC method) of 400-10000, preferably a polyol having a number averaged molecular weight Mn (by the GPC method) of 1000-8000, more preferably polyether glycol (especially polyethylene glycol) having a number averaged molecular weight Mn (by the GPC method) of 1000-8000, wherein the adsorbent II is used with an amount of 0.1-10 wt % relative to the amount of the porous refractory carrier;

(4-2) Onto the product obtained from the step (4-1), an active metal component A, optionally an active metal component C and optionally an auxiliary component are supported, wherein the active metal component A is Ni, the active metal component C is one or more selected from the group consisting of Group VIB metals in the element periodic table, preferably one or more selected from the group consisting of Mo and W, more preferably Mo, the auxiliary component is one or more selected from the group consisting of fluorine, silicon, phosphorus, titanium, zirconium and boron, preferably one or more selected from the group consisting of fluorine and phosphorus, more preferably phosphorus, (4-3) By unsaturated impregnation, onto the product obtained from the step (4-2), an adsorbent I is supported, and optionally an organic alcohol having a carbon atom number of 1-5 (especially a monohydric alcohol or polyol, preferably one or more selected from the group consisting of ethylene glycol, propylene glycol, glycerin, pentaerythritol and xylitol) is simultaneously supported, wherein the adsorbent I is one or more selected from the group consisting of organic carboxylic acids (especially monohydric or polyhydric carboxylic acids, preferably dihydric carboxylic acids) having a carbon atom number of 2-15 and ammonium salts thereof, preferably one or more selected from the group consisting of acetic acid, oxalic acid, lactic acid, malonic acid, tartaric acid, malic acid, citric acid, trichloroacetic acid, monochloroacetic acid, mercaptoacetic acid, mercaptopropionic acid, ethylenediamine tetraacetic acid, nitrilotriacetic acid, diaminocyclohexane tetraacetic acid and ammonium salts thereof, the adsorbent I is used with an amount of 0.1-10 wt % relative to the amount of the porous refractory carrier, the organic alcohol is used with an amount of 0.1-10 wt % relative to the amount of the porous refractory carrier, (4-4) Onto the product obtained from the step (4-3), an active metal component B, optionally the active metal component C and optionally the auxiliary component are supported, wherein the active metal component B is one or more selected from the group consisting of Group VIII metals other than Ni in the element periodic table, preferably Co, and (4-5) Optionally before the beginning of the step (4-1), after the completion of the step (4-2), while before the beginning of the step (4-3) and/or after the completion of the step (4-4), onto the porous refractory carrier, the active metal component C and optionally the auxiliary component are supported, with the proviso that the active metal component C is supported through at least one out of the step (4-2), the step (4-4) and the step (4-5) (preferably through a combination of the step (4-2) and the step (4-4)).

8. The process according to any one of the preceding aspects, further comprising at least one out of the following steps:

(I) After the completion of the step (1-1) while before the beginning of the step (1-2), the obtained product is aged for 0.5-8 h (preferably 0.5-6 h) or not aged, and then/or at a temperature of 60-250 degrees Celsius (preferably 100-200 degrees Celsius) dried for 0.5-20 h (preferably 1-6 h);

(II) After the completion of the step (1-2) while before the beginning of the step (1-3), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(III) After the completion of the step (1-3), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(IV) After the completion of the step (2-1) while before the beginning of the step (2-2), the obtained product is aged for 1-12 h (preferably 4-12 h), and then/or at a temperature of 60-250 degrees Celsius (preferably 100-200 degrees Celsius) dried for 0.5-20 h (preferably 1-6 h);

(V) After the completion of the step (2-2) while before the beginning of the step (2-3), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(VI) After the completion of the step (2-3), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(VII) After the completion of the step (3-1) while before the beginning of the step (3-2), the obtained product is aged for 0.5-8 h (preferably 0.5-6 h) or not aged, and then/or at a temperature of 60-250 degrees Celsius (preferably 100-200 degrees Celsius) dried for 0.5-20 h (preferably 1-6 h);

(VIII) After the completion of the step (3-2) while before the beginning of the step (3-3), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(IX) After the completion of the step (3-3) while before the beginning of the step (3-4), the obtained product is aged for 1-12 h (preferably 4-12 h), and then/or at a temperature of 60-250 degrees Celsius (preferably 100-200 degrees Celsius) dried for 0.5-20 h (preferably 1-6 h);

(X) After the completion of the step (3-4) while before the beginning of the step (3-5), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(XI) After the completion of the step (3-5), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(XII) After the completion of the step (4-1) while before the beginning of the step (4-2), the obtained product is aged for 1-12 h (preferably 4-12 h), and then/or at a temperature of 60-250 degrees Celsius (preferably 100-200 degrees Celsius) dried for 0.5-20 h (preferably 1-6 h);

(XIII) After the completion of the step (4-2) while before the beginning of the step (4-3), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(IXV) After the completion of the step (4-3) while before the beginning of the step (4-4), the obtained product is aged for 0.5-8 h (preferably 0.5-6 h) or not aged, and then/or at a temperature of 60-250 degrees Celsius (preferably 100-200 degrees Celsius) dried for 0.5-20 h (preferably 1-6 h);

(XV) After the completion of the step (4-4) while before the beginning of the step (4-5), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h);

(XVI) After the completion of the step (4-5), the obtained product is aged for 0.5-6 h (preferably 0.5-4 h) or not aged, at a temperature of 70-200 degrees Celsius (preferably 100-160 degrees Celsius) dried for 0.5-20 h (preferably 1-6 h) and at a temperature of 300-750 degrees Celsius (preferably 400-650 degrees Celsius) calcinated for 0.5-20 h (preferably 1-6 h).

9. The process according to any one of the preceding aspects, wherein the active metal component C includes Mo, and Mo is supported through a combination of the step (1-2) and the step (1-3), a combination of the step (2-3) and the step (2-2), a combination of the step (3-2) and the step (3-4) or a combination of the step (4-4) and the step (4-2), wherein in the combination, the ratio by molar of the amount of Mo to be supported in the preceding step to the amount of Mo to be supported in the succeeding step is 0.4-2.5:1, preferably 0.4-2.0:1

10. Use of the hydrotreating catalyst according to any one of the preceding aspects or a hydrotreating catalyst produced in line with the process according to any one of the preceding aspects in the hydrodesulfurization of heavy distillate oil (especially diesel oil) as a hydrodesulfurization catalyst.

11. A process for hydrodesulfurizating heavy distillate oil (especially diesel oil), comprising a step of contacting a heavy distillate oil feedstock with the hydrotreating catalyst according to any one of the preceding aspects or a hydrotreating catalyst produced in line with the process according to any one of the preceding aspects under hydrodesulfurization conditions.

TECHNICAL EFFECTS

The hydrotreating catalyst according to this invention, by distributing the active metal component having a relatively higher hydrodearomatization activity (for example Ni, in combination with Mo, W or Mo+W) in the catalyst particle in a "the closer to the surface the higher the concentration" manner, or distributing the active metal component having a relatively higher hydrodesulfurization activity (for example Co, in combination with Mo) in the catalyst particle in a "the closer to the center the higher the concentration" manner, or a combination of the two manners, the heavy distillate oil (deep) hydrodesulfurization activity thereof can be significantly improved.

Without being bounded by any theory, it is believed that hardly desulfurizing compounds in heavy distillate oil when contact the hydrotreating catalyst (particle) of this invention, are subject to a hydrodearomatization reaction at or near the surface of the catalyst particle, and then newly generated hydrodearomatization reaction products (with any steric hindrance removed) immediately through diffusion enter inward of the catalyst particle to further conduct a hydrodesulfurization reaction, i.e. on one single (each) catalyst particle, the hardly desulfurizing compounds are successively subject to the hydrodearomatization reaction and the hydrodesulfurization reaction (hereafter sometimes also referred to as relay hydrogenation reaction), whereby being rapidly removed from the heavy distillate oil. Further, the hydrotreating catalyst according to this invention follows the reaction sequence of the relay hydrogenation reaction, by distributing the active metal component having a relatively higher hydrodearomatization activity in the catalyst particle in a "the closer to the surface the higher the concentration" manner, or distributing the active metal component having a relatively higher (direct) hydrodesulfurization activity in the catalyst particle in a "the closer to the center the higher the concentration" manner, or a combination of the two manners, such that the relay hydrogenation reaction will proceed in a more effective manner, whereby providing the hydrotreating catalyst of this invention with higher performances, especially in removing the hardly desulfurizing compounds.

FIGURE DESCRIPTION

Figure 1B:
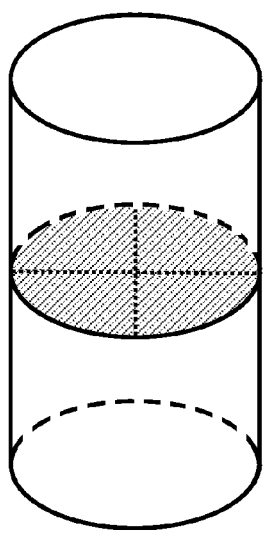
Figure 1C:
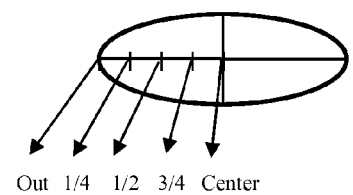
Figure 2:
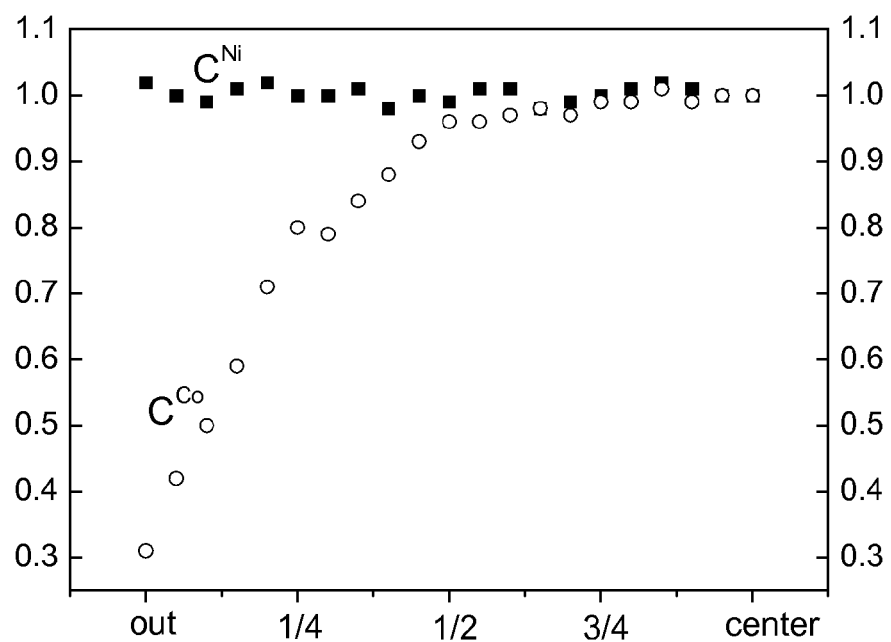
Figure 3:
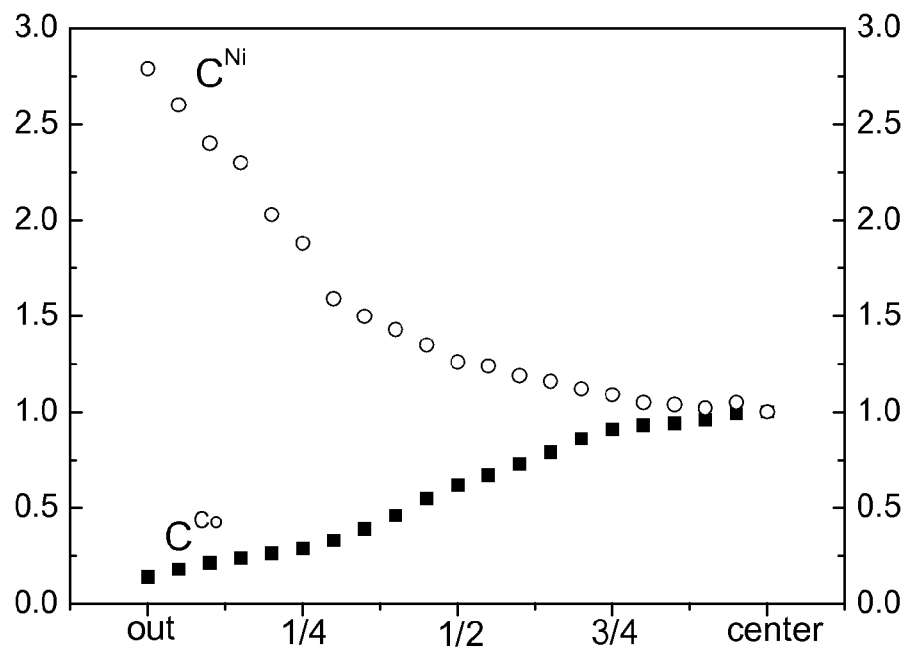
Figure 4:
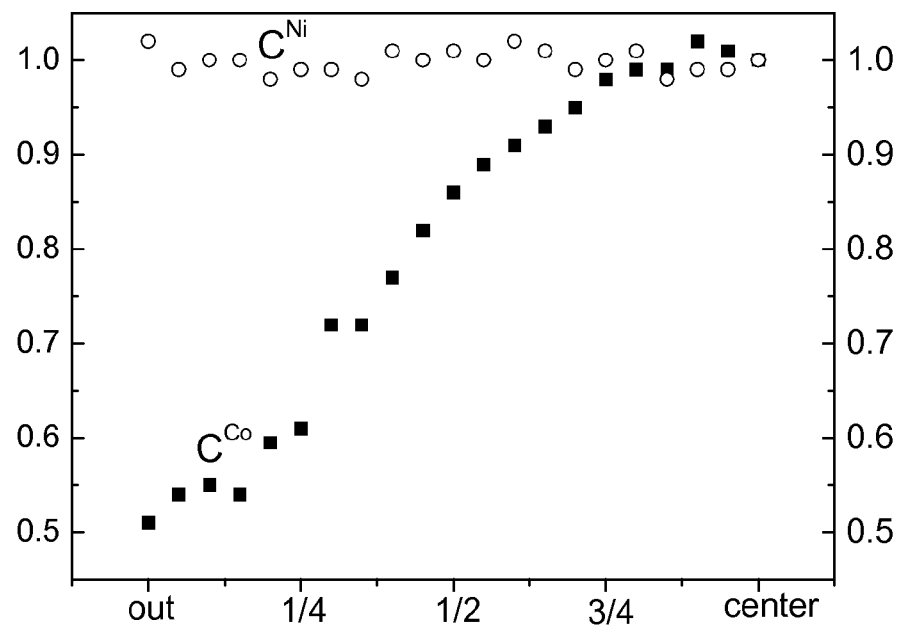
Figure 5:
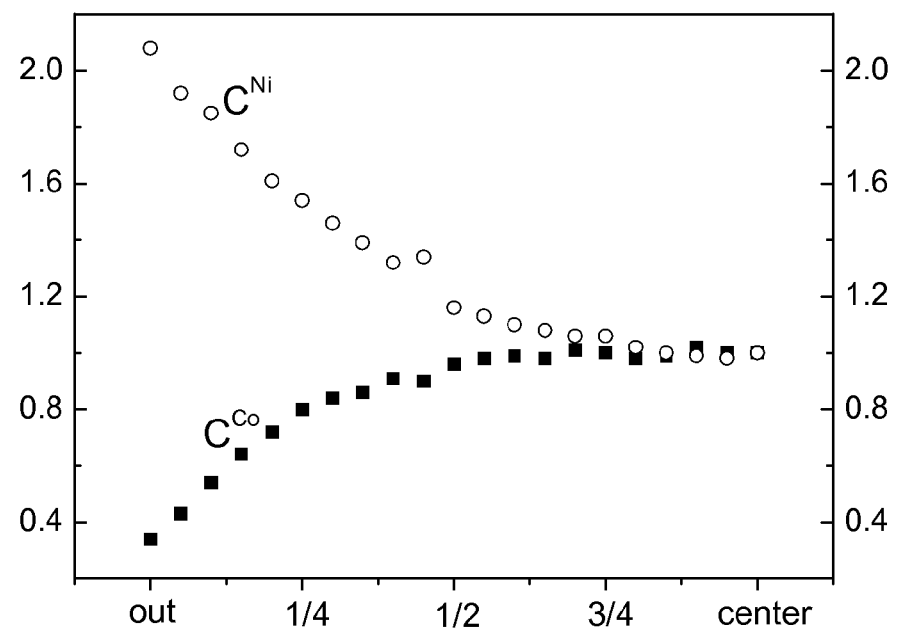

FIG. 1 illustrates how to cut through the particle of a hydrotreating catalyst according to this invention. FIG. 1(a) illustrates how a spherical catalyst particle is cut through, FIG. 1(b) illustrates how a columnar catalyst particle is cut through, FIG. 1(c) illustrates a cross-section obtained with this cut and each position point on the cross-section. In these figures, the symbol "out" represents an arbitrary position point at the outmost edge of the cross-section, the symbol "¼" represents the ¼ position point, the symbol "½" represents the ½ position point, the symbol "¾" represents the ¾ position point, and the symbol "center" represents the central point of the cross-section.

FIG. 2 to FIG. 5 illustrate the concentration distribution of the active metal component A (Ni) and the active metal component B (Co) on the cross-section of the catalyst particle obtained by the examples. The X-axis represents the position point on the cross-section, and the Y-axis represents the ratio of the concentration at a position point on the particle cross-section to that at the central point. Herein, FIG. 2 corresponds to the catalyst C4 obtained in Example I-2, FIG. 3 corresponds to the catalyst C1 obtained in Example II-1, FIG. 4 corresponds to the catalyst C3 obtained in Example III-1, and FIG. 5 corresponds to the catalyst C6 obtained in Example IV-2.

SPECIFIC MODE TO CARRY OUT THIS INVENTION

This invention will be described in details hereinafter with reference to the following specific embodiments. However, it should be noted that the protection scope of this invention should not be construed as limited to these specific embodiments, but rather determined by the attached claims.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention.

Further, to the extent that any meaning or definition of a term in this document conflicts with any meaning or definition of the same term in a document incorporated by reference, the meaning or definition assigned to that term in this document shall govern.

In the context of this specification, the term "unsaturated impregnation" should be interpreted in a manner conventionally known in this field, and refers to that during impregnation, the wetting liquid for impregnation (also referred to as impregnating liquid or wetting liquid) is used at an amount in volume less than the saturated liquid absorption of an object (for example, carrier particles) to be impregnated. For example, by volume, for a predetermined amount (by mass) of to-be-impregnated object (for example, carrier particles), the ratio of the volume of the wetting liquid to the saturated liquid absorption of the to-be-impregnated object (calculated as volume) is generally 0.01-0.6:1, preferably 0.02-0.4:1. The unsaturated impregnation is generally conducted at normal pressures and temperatures, but sometimes if needed, could be conducted at elevated temperatures, lowered or elevated pressures, without any specific limitation thereto.

In the context of this specification, the term "saturated impregnation" (also referred to as incipient wetness impregnation) should be interpreted in a manner conventionally known in this field, and refers to that during impregnation, the volume of the wetting liquid for impregnation (also referred to as impregnating liquid or wetting liquid) is (substantially) equal to the saturated liquid absorption of a to-be-impregnated object (for example, carrier particles). For example, by volume, for a predetermined amount (by mass) of to-be-impregnated object (for example, carrier particles), the ratio of the volume of the wetting liquid to the saturated liquid absorption of the to-be-impregnated object (calculated as volume) is generally 0.9-1.1:1, preferably 0.95-1.05:1. The saturated impregnation is generally conducted at normal pressures and temperatures, but sometimes if needed, could be conducted at elevated temperatures, lowered or elevated pressures, without any specific limitation thereto.

In the context of this specification, the term "oversaturated impregnation" should be interpreted in a manner conventionally known in this field, and refers to that during impregnation, the volume of the wetting liquid for impregnation (also referred to as impregnating liquid or wetting liquid) is greater than the saturated liquid absorption of a to-be-impregnated object (for example, carrier particles). For example, by volume, for a predetermined amount (by mass) of to-be-impregnated object (for example, a carrier particle), the ratio of the volume of the wetting liquid to the saturated liquid absorption of the to-be-impregnated object (calculated as volume) is generally 1.5-15:1, preferably 5-10:1. The oversaturated impregnation is generally conducted at normal pressures and temperatures, but sometimes if needed, could be conducted at elevated temperatures, lowered or elevated pressures, without any specific limitation thereto.

Unless otherwise specified, percents, parts or ratios or the like mentioned in this specification are all on a weight basis.

According to this invention, related to is a hydrotreating catalyst. The hydrotreating catalyst is in a particulate form, and comprises a porous refractory carrier, and an active metal component A, an active metal component B and an active metal component C supported thereon. Onto the porous refractory carrier, it is optional to further support an auxiliary component.

It is preferable to this invention that, each individual catalyst particle, at the same time, comprises the porous refractory carrier, the active metal component A, the active metal component B and the active metal component C, and optionally the auxiliary component (if any).

According to this invention, the hydrotreating catalyst is solid and in a particulate form, rather than in an amorphous form like powder. As the particulate form, there may be exemplified any shape conventionally known in this field for a hydrotreating catalyst, for example, there may be further exemplified a spherical or columnar shape. As the spherical shape, for example, there may be exemplified a round or oval shape; as the columnar shape, for example, there may be exemplified a cylindrical shape, a quadrangular shape or a columnar shape with profiled cross-section (for example, three-leaf clover, four-leaf clover).

In the context of this specification, by the "cross-section" of the catalyst particle, it refers to the whole surface exposed by cutting one single catalyst particle in the minimal size direction thereof through the geometrical center of its shape. For example, when the catalyst particle is in a spherical shape, the cross-section refers to the whole surface exposed by cutting the sphere in the radius or minor-axis direction thereof through the spherical center (for example, see FIG. 1(a)). Or, when the catalyst particle is in a columnar shape, the cross-section refers to the whole surface exposed by cutting the column in a direction perpendicular to the dimension represented by length (the length dimension) through the central point of the length dimension (for example, see FIG. 1(b)).

In the context of this specification, the periphery of the exposed surface is referred to as the outmost edge of the cross-section, and the geometrical center thereof (for example, the aforesaid spherical center or central point of the length dimension) is referred to as the central point on the cross-section.

According to this invention, the active metal component A is Ni. The active metal component A generally presents as nickel oxide (for example, NiO) on the carrier.

According to this invention, the active metal component B is one or more Group VIII metal other than Ni in the element periodic table, preferably one or more Group VIII non-noble metal other than Ni, most preferably Co. The active metal component B generally presents as the corresponding metal oxide (for example, CoO) on the carrier.

According to this invention, the active metal component C is one or more Group VIB metal in the element periodic table, preferably one or more of Mo and W, more preferably Mo. The active metal component C generally presents as the corresponding metal oxide (for example, $MoO_3$ and $WO_3$) on the carrier.

According to this invention, the auxiliary component is an optional component, and may be one or more selected from the group consisting of fluorine, silicon, phosphorus, titanium, zirconium and boron, preferably one or more selected from the group consisting of fluorine and phosphorus, more preferably phosphorus (P).

According to this invention, the porous refractory carrier is preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, most preferably alumina.

According to this invention, the porous refractory carrier preferably contains alumina as the essential component.

According to this invention, the specific surface area (by the BET method) of the hydrotreating catalyst is generally 100-260 $m^2/g$, preferably 120-220 $m^2/g$, and the pore volume (by the BET method) is generally 0.20-0.60 ml/g, preferably 0.20-0.50 ml/g.

According to this invention, in the hydrotreating catalyst, relative to the weight of the catalyst, the content of the active metal component A (as NiO) is generally 1-8 wt %, preferably 1.5-6.0 wt %.

According to this invention, in the hydrotreating catalyst, relative to the weight of the catalyst, the content of the active metal component B (as the corresponding oxide, for example, Co as CoO) is generally 0.5 wt %, 1 wt % or 1.5 wt % at least, and generally 6 wt % or 8 wt % at most.

According to this invention, in the hydrotreating catalyst, relative to the weight of the catalyst, the content (total content) of the active metal component C (as the corresponding oxide) is generally 6-60 wt %, preferably 6-40 wt %. Especially, when the active metal component C includes Mo, relative to the weight of the catalyst, the content of Mo (as $MoO_3$) is generally 6 wt %, 8 wt % or 10 wt % at least, and generally 26 wt %, 32 wt % or 40 wt % at most. When the active metal component C includes W, relative to the weight of the catalyst, the content of the W (as $WO_3$) is generally 6-28 wt %, preferably 8-26 wt %.

According to this invention, in the hydrotreating catalyst, relative to the weight of the catalyst, the content of the auxiliary component (in terms of element) is generally 30 wt % or less, preferably 20 wt % or less. Especially, when the auxiliary component includes phosphorus, relative to the weight of the catalyst, the content of phosphorus (as $P_2O_5$) is generally 1-6 wt %, preferably 1-5 wt %. The auxiliary component includes fluorine, relative to the weight of the catalyst, the content of fluorine (as F) is generally 1-6 wt %, preferably 1-5 wt %.

According to this invention, in the hydrotreating catalyst, relative to the weight of the catalyst, the content of the porous refractory carrier is generally 45-89 wt % or 46-87 wt %, sometimes may be 55-85 wt %, preferably the remaining.

According to this invention, the content of the active metal components A, B and C and that of the auxiliary component are determined by a method conventionally known in this field, for example, X ray fluorescence spectrometry.

According to this invention, the concentration distribution of the active metal component A meets any one out of the following conditions (I) and (II).

Condition (I): throughout the cross-section of each individual catalyst particle, the concentration thereof substantially uniformly distributes.

Condition (II): throughout the cross-section of each individual catalyst particle, the concentration thereof meets the following formulas (1) and (2) at the same time:

$$C^A_{out} > C^A_{1/2} > 1 \quad \text{Formula (1)}$$

$$C^A_{out} \geq 1.5 \quad \text{Formula (2)}$$

According to this invention, the symbol $C^A_{out}$ represents the ratio of the concentration of the active metal component A at an arbitrary position point $P_A$ (an arbitrarily and randomly selected position point) on the outmost edge of the cross-section of the catalyst particle to the concentration of the active metal component A at the central point on the cross-section of the catalyst particle, and assuming that the length value of the line segment connecting the central point and the position point $P_A$ on the cross-section of the catalyst particle is $L_A$ (without a unit of measurement), the symbol $C^A_{1/2}$ represents the ratio of the concentration of the active metal component A at the position point on the line segment $(1/2)L_A$ away from the position point $P_A$ (also referred to as ½ position point; hereinafter similar expressions are to be interpreted similarly) to the concentration of the active metal component A at the central point on the cross-section of the catalyst particle, the symbol $C^A_{1/4}$ represents the ratio of the concentration of the active metal component A at the position point on the line segment $(1/4)L_A$ away from the position point $P_A$ (also referred to as ¼ position point; hereinafter similar expressions are to be interpreted similarly) to the concentration of the active metal component A at the central point on the cross-section of the catalyst particle, the symbol $C^A_{3/4}$ represents the ratio of the concentration of the active metal component A at the position point on the line segment $(3/4)L_A$ away from the position point $P_A$ (also referred to as ¾ position point; hereinafter similar expressions are to be interpreted similarly) to the concentration of the active metal component A at the central point on the cross-section of the catalyst particle, the symbol $C^A_{opt}$ represents the ratio of the concentration of the active metal component A at an arbitrary position point on the line segment (i.e. an arbitrarily and randomly selected position point on the line segment, but excluding the central point and the position point $P_A$) to the concentration of the active metal component A at the central point on the cross-section of the catalyst particle.

According to this invention, in the condition (I), by "substantially uniformly", it refers to that the concentration distribution of the active metal component A throughout the whole cross-section of each individual catalyst particle presents in a uniform manner, with some concentration distribution fluctuation (deviation) reasonable or negligible to a person skilled in the art or unavoidable for the existing technological development level in this field. For example, in this connection, the deviation of the $C^A_{out}$ may be in the range of ±5% and the deviation of the $C^A_{opt}$ may be in the range of ±5%, preferably the deviation of the $C^A_{out}$ in the range of ±2% and the deviation of the $C^A_{opt}$ in the range of ±2%. The concentration distribution fluctuation does not substantially compromises the objects of this invention and thus being acceptable, and is therefore comprised in the present protection scope.

According to this invention, as the formula (1), it is preferably $C^A_{out} > C^A_{1/4} > C^A_{1/2} > C^A_{3/4} > 1$, more preferably $C^A_{out} > C^A_{opt} > 1$.

According to this invention, as the formula (1), it is more preferably $C^A_{out}/C^A_{1/2} = 1.5$-$2.6$, preferably 1.7-2.5.

According to this invention, as the formula (1), it is more preferably $C^A_{out}/C^A_{1/4} = 1.2$-$1.8$, preferably 1.3-1.7.

According to this invention, as the formula (1), it is more preferably $C^A_{1/4}/C^A_{1/2} = 1.1$-$1.7$, preferably 1.2-1.6.

According to this invention, preferably $C^A_{out} \geq 2.0$, more preferably $C^A_{out} \geq 2.4$.

According to this invention, in general, $C^A_{out} \leq 5.0$, preferably $C^A_{out} \leq 4.0$.

According to a further preferred embodiment of this invention, according to the formula (1), it is preferably that throughout the cross-section of each individual catalyst particle, along the line segment from the position point $P_A$ to the central point, the concentration of the active metal component A substantially gradually decreases.

According to this invention, by "substantially gradually decrease", it refers to that the concentration distribution of the active metal component A along the line segment from the position point $P_A$ to the central point presents a gradually decreasing trend, but it is acceptable that there may exist one or more local section(s) on the line segment; Within the local section, the concentration distribution of the active metal component A along the line segment presents a different trend (for example, remaining constant and/or gradually increasing and/or orderless). With the proviso that, the existence of the local section is reasonable or negligible to a person skilled in the art, or unavoidable for the existing technological development level in this field, and the existence of the local section will not hinder a person skilled in the art from identifying the concentration distribution of the active metal component A along the line segment still as "gradually decreasing" if viewed as a whole. Further, the existence of the local section does not substantially compromise the objects of this invention and thus being acceptable, and is therefore comprised in the present protection scope.

According to this further preferred embodiment, as the formula (1), for example, it is preferable to meet the formula (1'), with the proviso that when the position point opt-1 and the position point opt-2 get much close to each other, for example, the calculated value of the relation $(d2_A - d1_A)/L_A$ is as small as, for example, 5% or less, preferably 2% or less, more preferably 1% or less, more preferably 0.5% or less, it is acceptable that the formula $C^A_{opt-1} > 90\% \, C^A_{opt-2}$ (preferably $C^A_{opt-1} > 95\% \, C^A_{opt-2}$, more preferably $C^A_{opt-1} > 98\% \, C^A_{opt-2}$) holds; In this connection, the formula $C^A_{opt-1} > C^A_{opt-2}$ does not necessarily hold.

$$C^A_{out} > C^A_{opt-1} > C^A_{opt-2} > 1. \quad \text{Formula (1')}$$

According to this invention, the symbol $C^A_{opt-1}$ represents the ratio of the concentration of the active metal component A at an arbitrary position point opt-1 on the line segment (i.e. an arbitrarily and randomly selected position point opt-1 on the line segment, but not including the central point and the position point $P_A$) to the concentration of the active metal component A at the central point on the cross-section of the catalyst particle, the symbol $C^A_{opt-2}$ represents the ratio of the concentration of the active metal component A at an arbitrary position point opt-2 on the line segment (i.e. an arbitrarily and randomly selected position point opt-2 on the line segment, but not including the central point and the position point $P_A$) to the concentration of the active metal component A at the central point on the cross-section of the catalyst particle, and assuming that the linear distance between the position point $P_A$ and the position point opt-1 is $d1_A$ in value, while the linear distance between the position point $P_A$ and the position point opt-2 is $d2_A$ in value, then $d1_A/d2_A < 1$.

According to this invention, under the most preferable (ideal) condition, the formula (1) is more preferably the formula (1'), that is, $C^A_{out} > C^A_{opt-1} > C^A_{opt-2} > 1$.

According to this invention, the concentration distribution of the active metal component B meets any one out of the following conditions (III) and (IV).

Condition (III): throughout the cross-section of each individual catalyst particle, the concentration thereof substantially uniformly distributes.

Condition (IV): throughout the cross-section of each individual catalyst particle, the concentration thereof meets the following formulas (3) and (4) at the same time:

$$C^B_{out} < C^B_{1/2} \leq 1 \quad \text{Formula (3)}$$

$$C^B_{out} \leq 0.80 \quad \text{Formula (4)}$$

According to this invention, the symbol $C^B_{out}$ represents the ratio of the concentration of the active metal component B at an arbitrary position point $P_B$ (an arbitrarily and randomly selected position point) on the outmost edge of the cross-section of the catalyst particle to the concentration of the active metal component B at the central point on the cross-section of the catalyst particle, and assuming that the length value of the line segment connecting the central point and the position point $P_B$ on the cross-section of the catalyst particle is $L_B$ (without a unit of measurement), the symbol $C^B_{1/2}$ represents the ratio of the concentration of the active metal component B at the position point on the line segment $(\frac{1}{2})L_B$ away from the position point $P_B$ to the concentration of the active metal component B at the central point on the cross-section of the catalyst particle, the symbol $C^B_{1/4}$ represents the ratio of the concentration of the active metal component B at the position point on the line segment $(\frac{1}{4})L_B$ away from the position point $P_B$ to the concentration of the active metal component B at the central point on the cross-section of the catalyst particle, the symbol $C^B_{3/4}$ represents the ratio of the concentration of the active metal component B at the position point on the line segment $(\frac{3}{4})L_B$ away from the position point $P_B$ to the concentration of the active metal component B at the central point on the cross-section of the catalyst particle, the symbol $C^B_{opt}$ represents the ratio of the concentration of the active metal component B at an arbitrary position point on the line segment (i.e. an arbitrarily and randomly selected position point on the line segment, but not including the central point and the position point $P_B$) to the concentration of the active metal component B at the central point on the cross-section of the catalyst particle.

According to this invention, in the condition (III), by "substantially uniformly", it refers to that the concentration distribution of the active metal component B throughout the whole cross-section of each individual catalyst particle presents in a uniform manner, with some concentration distribution fluctuation (deviation) reasonable or negligible to a person skilled in the art or unavoidable for the existing technological development level in this field. For example, in this connection, the deviation of the $C^B_{out}$ may be in the range of ±5% and the deviation of the $C^B_{opt}$ may be in the range of ±5%, preferably the deviation of the $C^B_{out}$ in the range of ±2% and the deviation of the $C^B_{opt}$ in the range of ±2%. The concentration distribution fluctuation does not substantially compromises the objects of this invention and thus being acceptable, and is therefore comprised in the present protection scope.

According to this invention, as the formula (3), it is preferably $C^B_{out} < C^B_{1/4} < C^B_{1/2} < C^B_{3/4} < 1$, more preferably $C^B_{out} < C^B_{opt} < 1$.

According to this invention, as the formula (3), it is more preferably $C^B_{out}/C^B_{1/2} = 0.2 - 0.8$, preferably 0.2-0.7.

According to this invention, as the formula (3), it is more preferably $C^B_{out}/C^B_{1/4} = 0.3 - 0.9$, preferably 0.3-0.85.

According to this invention, as the formula (3), it is more preferably $C^B_{1/4}/C^B_{1/2} = 0.4 - 0.9$, preferably 0.4-0.87.

According to this invention, it is preferably $C^B_{out} \leq 0.70$, preferably $C^B_{out} \leq 0.68$, more preferably $C^B_{out} \leq 0.60$.

According to this invention, in general, $C^B_{out} \geq 0.10$, preferably $C^B_{out} \geq 0.20$.

According to a further preferred embodiment of this invention, according to the formula (3), it is preferably that throughout the cross-section of each individual catalyst particle, along the line segment from the position point $P_B$ to the central point, the concentration of the active metal component B substantially gradually increases.

According to this invention, by "substantially gradually increase", it refers to that the concentration distribution of the active metal component B along the line segment from the position point $P_B$ to the central point presents a gradually increasing trend, but it is acceptable that there may exist one or more local section(s); Within the local section, the concentration distribution of the active metal component B along the line segment presents a different trend (for example, remaining constant and/or gradually decreasing and/or orderless). With the proviso that, the existence of the local section is reasonable or negligible to a person skilled in the art, or unavoidable for the existing technological development level in this field, and the existence of the local section does not hinder a person skilled in the art from identifying the concentration distribution of the active metal component B along the line segment still as "gradually increasing" if viewed as a whole. Further, the existence of the local section does not substantially compromises the objects of this invention and thus being acceptable, and is therefore comprised in the present protection scope.

According to this further preferred embodiment, as the formula (3), for example, it is preferable to meet the formula (3'), with the proviso that when the position point opt-1 and the position point opt-2 get much close to each other, for example, the calculated value of the relation $(d2_B - d1_B)/L_B$ is as small as, for example, 5% or less, preferably 2% or less, more preferably 1% or less, more preferably 0.5% or less, it is acceptable that the formula $C^B_{opt-1} < 110\% \ C^B_{opt-2}$ (preferably $C^B_{opt-1} < 105\% \ C^B_{opt-2}$, more preferably $C^B_{opt-1} < 102\% \ C^B_{opt-2}$) holds; In this connection, the formula $C^B_{opt-1} < C^B_{opt-2}$ does not necessarily hold.

$$C^B_{out} < C^B_{opt-1} < C^B_{opt-2} \leq 1 \quad \text{Formula (3')}$$

According to this invention, the symbol $C^B_{opt-1}$ represents the ratio of the concentration of the active metal component B at an arbitrary position point opt-1 on the line segment (i.e. an arbitrarily and randomly selected position point opt-1 on the line segment, but not including the central point and the position point $P_B$) to the concentration of the active metal component B at the central point on the cross-section of the catalyst particle, the symbol $C^B_{opt-2}$ represents the ratio of the concentration of the active metal component B at an arbitrary position point opt-2 on the line segment (i.e. an arbitrarily and randomly selected position point opt-2 on the line segment, but not including the central point and the position point $P_B$) to the concentration of the active metal component B at the central point on the cross-section of the catalyst particle, and assuming that the linear distance between the position point $P_B$ and the position point opt-1 is d1$_B$ in value, while the linear distance between the position point P$_B$ and the position point opt-2 is d2$_B$ in value, then d1$_B$/d2$_B$<1.

According to this invention, under the most preferable (ideal) condition, the formula (3) is more preferably the formula (3'), that is, $C^B_{out} < C^B_{opt-1} < C^B_{opt-2} < 1$.

To this invention, it is critical that, the concentration distribution of the active metal component A and the concentration distribution of the active metal component B do not meet the conditions (I) and (III) at the same time, otherwise the objects of this invention will necessarily fail.

According to a preferred embodiment of this invention, the concentration distribution of the active metal component A meets the condition (II), and at the same time, the concentration distribution of the active metal component B meets the condition (IV), whereby providing the hydrotreating catalyst of this invention with further significantly improved heavy distillate oil (deep) hydrodesulfurization activity.

According to this invention, as the active metal component C, it is preferably Mo or a combination of Mo and W.

According to this invention, there is no specific limitation as to the concentration distribution of the active metal component C (for example, Mo or a combination of Mo and W) in the catalyst particle, for example, which component C may substantially uniformly, in an ordered manner or orderless distribute throughout the cross-section of each individual catalyst particle.

According to a preferred embodiment of this invention, the concentration distribution of the active metal component C in the catalyst particle is predetermined such that at an arbitrary position point throughout the cross-section of each individual catalyst particle, the concentration of the active metal component C is sufficient to meet any requirement set by the hydrogenation reaction. For example, at an arbitrary position point throughout the cross-section of each individual catalyst particle, the concentration of Mo is sufficient for Mo to exhibit the expected hydrodesulfurization activity in combination with Ni and/or Co at this position point, or the concentration of W is sufficient for W to exhibit the expected hydrodearomatization activity in combination with Ni at this position point.

According to a preferred embodiment of this invention, when the active metal component C is Mo, the concentration distribution of Mo preferably meets any one out of the following conditions (V) and (VI).

Condition (V): throughout the cross-section of each individual catalyst particle, the concentration thereof substantially uniformly distributes.

Condition (VI): throughout the cross-section of each individual catalyst particle, the concentration thereof meets the following formulas (5) and (6) at the same time.

$$C^{Mo}_{out} < C^{Mo}_{1/2} < 1 \quad \text{Formula (5)}$$

$$0.08 \leq C^{Mo}_{out} \leq 0.70 \quad \text{Formula (6)}$$

According to this invention, the symbol $C^{Mo}_{out}$ represents the ratio of the concentration of the active metal component Mo at an arbitrary position point P$_{Mo}$ (an arbitrarily and randomly selected position point) on the outmost edge of the cross-section of the catalyst particle to the concentration of the active metal component Mo at the central point on the cross-section of the catalyst particle, and assuming that the length value of the line segment connecting the central point and the position point P$_{Mo}$ on the cross-section of the catalyst particle is L$_{Mo}$ (without a unit of measurement), the symbol $C^{Mo}_{1/2}$ represents the ratio of the concentration of the active metal component Mo at the position point on the line segment (½)L$_{Mo}$ away from the position point P$_{Mo}$ to the concentration of the active metal component Mo at the central point on the cross-section of the catalyst particle, the symbol $C^{Mo}_{1/4}$ represents the ratio of the concentration of the active metal component Mo at the position point on the line segment (¼)L$_{Mo}$ away from the position point P$_{Mo}$ to the concentration of the active metal component Mo at the central point on the cross-section of the catalyst particle, the symbol $C^{Mo}_{3/4}$ represents the ratio of the concentration of the active metal component Mo at the position point on the line segment (¾)L$_{Mo}$ away from the position point P$_{Mo}$ to the concentration of the active metal component Mo at the central point on the cross-section of the catalyst particle, the symbol $C^{Mo}_{opt}$ represents the ratio of the concentration of the active metal component Mo at an arbitrary position point on the line segment (i.e. an arbitrarily and randomly selected position point on the line segment, but not including the central point and the position point P$_{Mo}$) to the concentration of the active metal component Mo at the central point on the cross-section of the catalyst particle.

According to this invention, in the condition (V), by "substantially uniformly", it refers to that the concentration distribution of Mo throughout the whole cross-section of each individual catalyst particle presents in a uniform manner, with some concentration distribution fluctuation (deviation) reasonable or negligible to a person skilled in the art or unavoidable for the existing technological development level in this field. For example, in this connection, the deviation of the $C^{Mo}_{out}$ may be in the range of ±5% and the deviation of the $C^{Mo}_{opt}$ may be in the range of ±5%, preferably the deviation of the $C^{Mo}_{out}$ in the range of ±2% and the deviation of the $C^{Mo}_{opt}$ in the range of ±2%. The concentration distribution fluctuation does not substantially compromises the objects of this invention and thus being acceptable, and is therefore comprised in the present protection scope.

According to this invention, as the formula (5), it is preferably $C^{Mo}_{out} < C^{Mo}_{1/4} < C^{Mo}_{1/2} < C^{Mo}_{3/4} < 1$, more preferably $C^{Mo}_{out} < C^{Mo}_{opt} < 1$.

According to a further preferred embodiment of this invention, according to the formula (5), it is preferably that throughout the cross-section of each individual catalyst particle, along the line segment from the position point P$_{Mo}$ to the central point, the concentration of the active metal component Mo substantially gradually increases.

According to this invention, by "substantially gradually increase", it refers to that the concentration distribution of the active metal component Mo along the line segment from the position point P$_{Mo}$ to the central point presents a gradually increasing trend, but it is acceptable that there may exist one or more local section(s); Within the local section, the concentration distribution of the active metal component Mo along the line segment presents a different trend (for example, remaining constant and/or gradually decreasing and/or orderless). With the proviso that, the existence of the local section is reasonable or negligible to a person skilled in the art, or unavoidable for the existing technological development level in this field, and the existence of the local section does not hinder a person skilled in the art from identifying the concentration distribution of the active metal component Mo along the line segment still as "gradually increasing" if viewed as a whole. Further, the existence of the local section does not substantially compromise the objects of this invention and thus being acceptable, and is therefore comprised in the present protection scope.

According to this further preferred embodiment, as the formula (5), for example, it is preferable to meet the formula (5'), with the proviso that when the position point opt-1 and the position point opt-2 get much close to each other, for example, the calculated value of the relation $(d2_{Mo}-d1_{Mo})/L_{Mo}$ is as small as, for example, 5% or less, preferably 2% or less, more preferably 1% or less, more preferably 0.5% or less, it is acceptable that the formula $C^{Mo}_{opt-1}<110\% \ C^{Mo}_{opt-2}$ (preferably $C^{Mo}_{opt-1}<105\% \ C^{Mo}_{opt-2}$, more preferably $C^{Mo}_{opt-1}<102\% \ C^{Mo}_{opt-2}$) holds; In this connection, the formula $C^{Mo}_{opt-1}<C^{Mo}_{opt-2}$ does not necessarily hold.

$$C^{Mo}_{out}<C^{Mo}_{opt-1}<C^{Mo}_{opt-2}<1 \quad \text{Formula (5')}$$

According to this invention, the symbol $C^{Mo}_{opt-1}$ represents the ratio of the concentration of the active metal component Mo at an arbitrary position point opt-1 on the line segment (i.e. an arbitrarily and randomly selected position point opt-1 on the line segment, but not including the central point and the position point $P_{Mo}$) to the concentration of the active metal component Mo at the central point on the cross-section of the catalyst particle, the symbol $C^{Mo}_{opt-2}$ represents the ratio of the concentration of the active metal component Mo at an arbitrary position point opt-2 on the line segment (i.e. an arbitrarily and randomly selected position point opt-2 on the line segment, but not including the central point and the position point $P_{Mo}$) to the concentration of the active metal component Mo at the central point on the cross-section of the catalyst particle, and assuming that the linear distance between the position point $P_{Mo}$ and the position point opt-1 is $d1_{Mo}$ in value, while the linear distance between the position point $P_{Mo}$ and the position point opt-2 is $d2_{Mo}$ in value, then $d1_{Mo}/d2_{Mo}<1$.

According to this invention, under the most preferable (ideal) condition, the formula (5) is more preferably the formula (5'), that is, $C^{Mo}_{out}<C^{Mo}_{opt-1}<C^{Mo}_{opt-2}<1$.

According to a preferred embodiment of this invention, when the active metal component C is the combination of Mo and W, the concentration distribution of Mo preferably meets any one out of the conditions (V) and (VI), while the concentration distribution of W preferably meets any one out of the following conditions (VII) and (VIII).

Condition (VII): throughout the cross-section of each individual catalyst particle, the concentration thereof substantially uniformly distributes.

Condition (VIII): throughout the cross-section of each individual catalyst particle, the concentration thereof meets the following formulas (7) and (8) at the same time.

$$C^{W}_{out}>C^{W}_{1/2}>1 \quad \text{Formula (7)}$$

$$7.0 \geq C^{W}_{out} \geq 1.2 \quad \text{Formula (8)}$$

According to this invention, the symbol $C^{W}_{out}$ represents the ratio of the concentration of the active metal component W at an arbitrary position point $P_W$ (an arbitrarily and randomly selected position point) on the outmost edge of the cross-section of the catalyst particle to the concentration of the active metal component W at the central point on the cross-section of the catalyst particle, and assuming that the length value of the line segment connecting the central point and the position point $P_W$ on the cross-section of the catalyst particle is $L_W$ (without a unit of measurement), the symbol $C^{W}_{1/2}$ represents the ratio of the concentration of the active metal component W at the position point on the line segment $(½)L_W$ away from the position point $P_W$ to the concentration of the active metal component W at the central point on the cross-section of the catalyst particle, the symbol $C^{W}_{1/4}$ represents the ratio of the concentration of the active metal component W at the position point on the line segment $(¼)L_W$ away from the position point $P_W$ to the concentration of the active metal component W at the central point on the cross-section of the catalyst particle, the symbol $C^{W}_{3/4}$ represents the ratio of the concentration of the active metal component W at the position point on the line segment $(¾)L_W$ away from the position point $P_W$ to the concentration of the active metal component W at the central point on the cross-section of the catalyst particle, the symbol $C^{W}_{opt}$ represents the ratio of the concentration of the active metal component W at an arbitrary position point on the line segment (i.e. an arbitrarily and randomly selected position point on the line segment, but not including the central point and the position point $P_W$) to the concentration of the active metal component W at the central point on the cross-section of the catalyst particle.

According to this invention, in the condition (VII), by "substantially uniformly", it refers to that the concentration distribution of the active metal component W throughout the whole cross-section of each individual catalyst particle presents in a uniform manner, with some concentration distribution fluctuation (deviation) reasonable or negligible to a person skilled in the art or unavoidable for the existing technological development level in this field. For example, in this connection, the deviation of the $C^{W}_{out}$ may be in the range of ±5% and the deviation of the $C^{W}_{opt}$ may be in the range of ±5%, preferably the deviation of the $C^{W}_{out}$ in the range of ±2% and the deviation of the $C^{W}_{opt}$ in the range of ±2%. The concentration distribution fluctuation does not substantially compromise the objects of this invention and thus being acceptable, and is therefore comprised in the present protection scope.

According to this invention, as the formula (7), it is preferably $C^{W}_{out}>C^{W}_{1/4}>C^{W}_{1/2}>C^{W}_{3/4}>1$, more preferably $C^{W}_{out}>C^{W}_{opt}>1$.

According to a further preferred embodiment of this invention, according to the formula (7), it is preferably that throughout the cross-section of each individual catalyst particle, along the line segment from the position point $P_W$ to the central point, the concentration of the active metal component W substantially gradually decreases.

According to this invention, by "substantially gradually decrease", it refers to that the concentration distribution of the active metal component W along the line segment from the position point $P_W$ to the central point presents a gradually decreasing trend, but it is acceptable that there may exist one or more local section(s); Within the local section, the concentration distribution of the active metal component W along the line segment presents a different trend (for example, remaining constant and/or gradually increasing and/or orderless). With the proviso that, the existence of the local section is reasonable or negligible to a person skilled in the art, or unavoidable for the existing technological development level in this field, and the existence of the local section does not hinder a person skilled in the art from identifying the concentration distribution of the active metal component W along the line segment still as "gradually decreasing" if viewed as a whole. Further, the existence of the local section does not substantially compromise the objects of this invention and thus being acceptable, and is therefore comprised in the present protection scope.

According to this further preferred embodiment, as the formula (7), for example, it is preferable to meet the formula (7'), with the proviso that when the position point opt-1 and the position point opt-2 get much close to each other, for example, the calculated value of the relation $(d2_W-d1_W)/L_W$ is as small as, for example, 5% or less, preferably 2% or less, more preferably 1% or less, more preferably 0.5% or less, it is acceptable that the formula $C^W_{opt-1} > 90\% \, C^W_{opt-2}$ (preferably $C^W_{opt-1} > 95\% \, C^W_{opt-2}$, more preferably $C^W_{opt-1} > 98\% \, C^W_{opt-2}$) holds; In this connection, the formula $C^W_{opt-1} > C^W_{opt-2}$ does not necessarily hold.

$$C^W_{out} > C^W_{opt-1} > C^W_{opt-2} > 1 \qquad \text{Formula (7')}$$

According to this invention, the symbol $C^W_{opt-1}$ represents the ratio of the concentration of the active metal component W at an arbitrary position point opt-1 on the line segment (i.e. an arbitrarily and randomly selected position point opt-1 on the line segment, but not including the central point and the position point $P_W$) to the concentration of the active metal component W at the central point on the cross-section of the catalyst particle, the symbol $C^W_{opt-2}$ represents the ratio of the concentration of the active metal component W at an arbitrary position point opt-2 on the line segment (i.e. an arbitrarily and randomly selected position point opt-2 on the line segment, but not including the central point and the position point $P_W$) to the concentration of the active metal component W at the central point on the cross-section of the catalyst particle, and assuming that the linear distance between the position point $P_W$ and the position point opt-1 is $d1_W$ in value, while the linear distance between the position point $P_W$ and the position point opt-2 is $d2_W$ in value, then $d1_W/d2_W < 1$.

According to this invention, under the most preferable (ideal) condition, the formula (7) is more preferably the formula (7'), that is, $C^W_{out} > C^W_{opt-1} > C^W_{opt-2} > 1$.

The hydrotreating catalyst according to this invention, it is preferable that, on the outmost surface of the catalyst particle, that is, at an arbitrary position point (an arbitrarily and randomly selected position point) on the outmost edge of the cross-section of the catalyst particle, the ratio of the concentration of the active metal component A to the concentration of the active metal component C (preferably the ratio of the concentration of Ni to the concentration of Mo, the ratio of the concentration of Ni to the concentration of W or the ratio of the concentration of Ni to the concentration of (W+Mo), more preferably the ratio of the concentration of Ni to the concentration of Mo) is generally 0.22-0.80, preferably 0.30-0.70.

The hydrotreating catalyst according to this invention, it is preferable that, at the central point of the catalyst particle, that is, at the central point on the cross-section of the catalyst particle, the ratio of the concentration of the active metal component B to the concentration of the active metal component C (preferably the ratio of the concentration of Co to the concentration of Mo) is generally 0.20-0.78, preferably 0.25-0.65.

According to this invention, there is no specific limitation as to the concentration distribution of the optional auxiliary component in the catalyst particle or throughout the cross-section of the catalyst particle, it may be in any manner conventionally known in this field, for example, as hereinbefore described, in a substantially uniform manner.

According to this invention, the concentration of each active metal component A, B and C and that of the optional auxiliary component at a position point on the cross-section of the catalyst particle or the concentration distribution thereof on the cross-section (as hereinbefore defined) may be determined in a manner conventionally known in this field by any known method. It is obvious to a person skilled in the art that, this invention does not concern on the specific value of each concentration (for example, the absolute value thereof or the unit of measurement thereof), but does concern on the relative value ratio between two concentrations (for example, the $C^A_{out}$). In this context, it is preferable to by the EPMA (Electron Probe Micro-analyzing) method determine each concentration, then upon a simple division calculation, the ratio could be easily obtained. It has been well known in this field as to how to conduct the determination and the calculation, then the explanations in details thereon are omitted herein. In this connection, each position point of this invention corresponds to a micro-region in the EPMA method.

According to this invention, the hydrotreating catalyst can be produced in line with any one out of the following first to fourth producing processes.

The First Producing Process

The first producing process of this invention comprises at least the following steps (1-1) to (1-3).

Step (1-1): By unsaturated impregnation, onto a particulate porous refractory carrier, an adsorbent I is supported.

According to this invention, the porous refractory carrier is preferably one or more selected from the group consisting of porous refractory oxides, more preferably one or more selected from the group consisting of porous inorganic refractory oxides, more preferably one or more selected from the group consisting of oxides of a Group II, Group III or Group IV element in the element periodic table, more preferably one or more selected from the group consisting of silica, alumina, magnesia, silica-alumina, silica-magnesia and alumina-magnesia, further preferably alumina.

According to this invention, the porous refractory carrier preferably comprises alumina as the essential component. As the alumina, for example, there may be exemplified one or more selected from the group consisting of γ-alumina, η-alumina, θ-alumina, δ-alumina and χ-alumina, preferably γ-alumina.

According to this invention, the porous refractory carrier is solid and in a particulate form, rather than in an amorphous form like powder. As the particulate shape, there may be exemplified any shape conventionally known in this field for the carrier of a hydrotreating catalyst, for example, there may be further exemplified a spherical, columnar or flake shape, preferably a spherical or columnar shape. As the spherical shape, for example, there may be exemplified a round or oval shape; as the columnar shape, for example, there may be exemplified a cylindrical, quadrangular or columnar shape with profiled cross-section (for example, three-leaf clover).

According to this invention, the porous refractory carrier for example, can be molded into the particulate shape by any process conventionally known in this field, or may be commercially available in the particulate shape. As the molding process, for example, there may be exemplified ball drop formation, rolling ball formation, extrusion formation or compression formation, preferably ball drop formation and extrusion formation. Specifically, for example, the oxide (covering a precursor of the oxide) or a mixture thereof, for example, alumina (or its precursor) and/or silica (or its precursor), may be molded by the molding process, and then calcinated. In this connection, the precursor of alumina for example may be one or more of alumina hydrates and aluminum sols, while the precursor of silica for example may be one or more of a water soluble silicon-containing compound and a silicon-containing compound capable of forming silica gel or sol in an aqueous medium by hydrolysis, for example one or more of water glass, silica sol and silicate esters. If needed, it is acceptable to add to a to-be-molded carrier or oxide a suitable amount of extrusion assistant and/or adhesive, and then conduct the molding. According to this invention, the extrusion assistant and the adhesive have been well known in this field with its nature and the amount to be used, for example, as a conventional extrusion assistant, there may be exemplified one or more of sesbania gum powder, methyl cellulose, starch, polyvinyl alcohol and polyalcohol.

According to this invention, the specific surface area (by the BET method) of the particulate porous refractory carrier is generally 100-500 m$^2$/g, preferably 150-400 m$^2$/g.

According to this invention, the pore volume (by the BET method) of the particulate porous refractory carrier is generally 0.1-1.0 ml/g, preferably 0.3-0.9 ml/g.

According to this invention, the bulk density of the particulate porous refractory carrier (by the mechanical tapping method) is generally 40-100 g/100 ml, preferably 50-70 g/100 ml.

According to this invention, the saturated liquid absorption of the particulate porous refractory carrier is generally 40-140 ml/100 g, preferably 60-100 ml/100 g. To measure the saturated liquid absorption, 100 g of the particulate porous refractory carrier is weighted and put into a separating funnel, then there is added 300 ml purified water so that the water level is above the upper physical surface of the carrier, let stand for 30 min, and then excess water is discharged into a graduated cylinder, and the volume L of the excess water is determined. In this connection, the formula for calculating the saturated liquid absorption is (300−L)÷100 (ml/100 g).

According to this invention, the average particle size of the particulate porous refractory carrier (by the screening method) is generally 3-8 mm, preferably 3-5 mm.

According to this invention, the adsorbent I is an organic carboxylic acid having a carbon atom number of 2-15, for example, there may be exemplified a monobasic or polybasic carboxylic acid of this type, preferably a dibasic carboxylic acid, or further an ammonium salt of the organic carboxylic acid. As the adsorbent I, it is preferably one or more of acetic acid, oxalic acid, lactic acid, malonic acid, tartaric acid, malic acid, citric acid, trichloroacetic acid, monochloroacetic acid, mercaptoacetic acid, mercaptopropionic acid, ethylenediamine tetraacetic acid, nitrilotriacetic acid, diaminocyclohexane tetraacetic acid and an ammonium salt thereof.

According to this invention, the amount of the adsorbent I is generally 0.1-10 wt %, preferably 0.5-9.0 wt %, relative to the weight of the particulate porous refractory carrier.

According to this invention, if needed, it is acceptable to further support an organic alcohol having a carbon atom number of 1 to 5 onto the particulate porous refractory carrier together with the adsorbent I. As the organic alcohol, for example, there may be exemplified a monobasic or polybasic alcohol of this type, preferably one or more of ethylene glycol, propylene glycol, glycerin, pentaerythritol and xylitol. In use, the amount of the organic alcohol is generally 0.1-10 wt %, preferably 0.5-9.0 wt % relative to the weight of the particulate porous refractory carrier.

In the context of this specification, for a simplified description, unless otherwise specified or obviously contradicting to any common knowledge in this field, the "particulate porous refractory carrier" is sometimes simply referred to as "porous refractory carrier".

According to this invention, to facilitate conducting of the unsaturated impregnation, the adsorbent I and the optional organic alcohol are preferably used in the form of wetting liquid (i.e. a solution containing the adsorbent I and optionally the organic alcohol). As the solvent for the solution, for example, there may be exemplified water, ethanol and a mixture of water and ethanol at any ratio therebetween, but sometimes not limiting thereto.

According to this invention, the unsaturated impregnation may be conducted in a manner conventionally known in this field, preferably as unsaturated spray impregnation. According to the unsaturated spray impregnation, the wetting liquid at a predetermined amount/ratio is directly sprayed onto the porous refractory carrier (as the to-be-impregnated object) to conduct the impregnation. In this connection, the spray impregnation duration is generally 1-40 min, preferably 2-20 min. For a uniform spray impregnation, for example, a sprayer with good atomizing effect may be used for uniformly distributing the wetting liquid onto the porous refractory carrier.

According to the first producing process, if needed or preferably, it is acceptable that after the completion of the step (1-1) while before the beginning of the following step (1-2), the product directly obtained from the step (1-1) is aged (hereinafter left stand) for 0.5-8 h (preferably 0.5-6 h) (referred to as aging step), or the product is at a temperature of 60-250 degrees Celsius (preferably 100-200 degrees Celsius) dried for 0.5-20 h (preferably 1-6 h) (referred to as drying step), or the product is firstly subject to the aging step, and then to the drying step. In this specification, the thus obtained product and the product directly obtained from the step (1-1) are indiscriminately and collectively referred to as "product obtained from the step (1-1)".

Step (1-2): Onto the product obtained from the step (1-1), there are supported the active metal component B, optionally the active metal component C and optionally the auxiliary component. This means that, onto the product obtained from the step (1-1), there are supported the active metal component B, and optionally at the same time and/or subsequently, the active metal component C and/or the auxiliary component. Preferably onto the product obtained from the step (1-1), there are simultaneously supported the active metal component B and the active metal component C, and optionally at the same time the auxiliary component.

According to this invention, the active metal component B, the active metal component C and the auxiliary component are as hereinbefore explained.

According to the first producing process, if needed or preferably, it is acceptable that after the completion of the step (1-2) while before the beginning of the following step (1-3), the product directly obtained from the step (1-2) is aged for 0.5-6 h (preferably 0.5-4 h) or not aged, at a temperature of 70-200 degrees Celsius (preferably 100-160 degrees Celsius) dried for 0.5-20 h (preferably 1-6 h), then at a temperature of 300-750 degrees Celsius (preferably 400-650 degrees Celsius) calcinated for 0.5-20 h (preferably 1-6 h). In this specification, the thus obtained product and the product directly obtained from the step (1-2) are indiscriminately and collectively referred to as "product obtained from the step (1-2)".

Step (1-3): Before the beginning of the step (1-1) and/or after the completion of the step (1-2), onto the porous refractory carrier, there are supported the active metal component A, optionally the active metal component C and optionally the auxiliary component. This means that, before the beginning of the step (1-1), onto the (particulate) porous refractory carrier, there are supported the active metal component A, and optionally precedently, simultaneously or subsequently the active metal component C and/or the auxiliary component, and preferably there are simultaneously supported the active metal component A and the active metal component C, and optionally precedently or simultaneously the auxiliary component, whereby obtaining a pre-treated porous refractory carrier (in the context of this specification, still referred to as porous refractory carrier); or, after the completion of the step (1-2), onto the product obtained from the step (1-2), there are supported (actually still supported onto the porous refractory carrier) the active metal component A, and optionally precedently, simultaneously or subsequently the active metal component C and/or the auxiliary component, and preferably there are simultaneously supported the active metal component A and the active metal component C, and optionally precedently or simultaneously the auxiliary component, whereby obtaining the hydrotreating catalyst of this invention; or a combination thereof.

According to this invention, the active metal component A is as hereinbefore explained.

According to the first producing process, if needed or preferably, it is acceptable that after the completion of the step (1-3), the product directly obtained from this step is aged for 0.5-6 h (preferably 0.5-4 h) or not aged, at a temperature of 70-200 degrees Celsius (preferably 100-160 degrees Celsius) dried for 0.5-20 h (preferably 1-6 h), then at a temperature of 300-750 degrees Celsius (preferably 400-650 degrees Celsius) calcinated for 0.5-20 h (preferably 1-6 h), and then subject to any succeeding step or the hydrotreating catalyst of this invention is obtained.

According to the first producing process, each of the aforesaid aging, drying or calcinating could be conducted in a manner conventionally known in this field, and if needed, may be conducted under inert (for example nitrogen gas) atmosphere or in air (preferably in air), without any specific limitation thereto.

According to this invention, there is no specific limitation as to how to conduct the supporting involved in the step (1-2) and the step (1-3), it may be any method capable of introducing the active metal component A, the active metal component C, the active metal component B and optionally the auxiliary component onto the carrier or the product. As the method, for example, there may be exemplified saturated impregnation or oversaturated impregnation. These methods have been well known in this field, any explanations in details thereto will be omitted herein. It is preferable that, the saturated impregnation is conducted in line with a saturated spray impregnation process; in this connection, the spray impregnation duration may be generally 5-40 min, preferably 10-20 min.

According to this invention, for easy conducting of the supporting, the active metal component A, the active metal component C, the active metal component B and optionally the auxiliary component are preferably used in the form of wetting liquid (i.e. a solution comprising the corresponding component, also referred to as impregnating liquid). As the solvent for the solution, for example, there may be exemplified water, ethanol and a mixture of water and ethanol at any ratio therebetween, but sometimes not limiting thereto.

According to this invention, for easy conducting of the supporting, each of the active metal component A, the active metal component C, the active metal component B and optionally the auxiliary component may generally originate from a soluble compound, which is reasonable in this field. Specifically, as the soluble compound of the active metal component A, for example, there may be exemplified a (water) soluble organic or inorganic acid salt thereof, especially nickel nitrate, nickel carbonate, basic nickel carbonate, nickel chloride, nickel oxalate and nickel sulfate. As the soluble compound of the active metal component A, one kind or a mixture of two or more kinds at any ratio therebetween could be used. As the soluble compound of the active metal component B, for example, there may be exemplified a (water) soluble organic or inorganic acid salt thereof, especially cobalt nitrate, cobalt carbonate, basic cobalt carbonate, cobalt chloride and cobalt oxalate. As the soluble compound of the active metal component B, one kind or a mixture of two or more kinds at any ratio therebetween could be used. As the soluble compound of the active metal component C, for example, there may be exemplified a (water) soluble oxometallate salt thereof, especially ammonium molybdate, ammonium paramolybdate, ammonium molybdophosphate, ammonium metatungstate and ethyl ammonium metatungstate. As the soluble compound of the active metal component C, one kind or a mixture of two or more kinds at any ratio therebetween could be used. As the soluble compound of the auxiliary component, for example, there may be exemplified phosphoric acid, phosphorous acid, phosphate, phosphite, trimethyl phosphate, ammonium hydrogen phosphate, ammonium dihydrogen phosphate and ammonium phosphate (corresponding to the phosphorus containing auxiliary component), ammonium borofluoride, HF, hydrofluoride, fluorosilicic acid, fluorosilicate and ammonium fluoride (corresponding to the fluorine containing auxiliary component). As the soluble compound of the auxiliary component, one kind or a mixture of two or more kinds at any ratio therebetween could be used.

According to this invention, in the step (1-2) and the step (1-3), there is no specific limitation as to the respective amount or the total amount (when supported respectively in more than one steps) of the components (i.e. the active metal component A, the active metal component C, the active metal component B and optionally the auxiliary component), including the concentration thereof in the corresponding wetting liquid and/or the amount of the wetting liquid to be used, as long as it is suitable for the supporting process involved in each step, and so predetermined that the content of each component (further including the porous refractory carrier) in the hydrotreating catalyst finally obtained by the first producing process is as defined hereinbefore by this specification. When two or more components are to be simultaneously supported, the two or more components may be in the same wetting liquid, or may be each independently or as a combination thereof in different wetting liquids.

According to the first producing process, it is necessary to through at least one out of the step (1-2) and the step (1-3), support the active metal component C (corresponding to the essential component of this invention), preferably through a combination of the step (1-2) and the step (1-3), support the active metal component C.

According to the first producing process, when the active metal component C includes Mo, it is preferably through a combination of the step (1-2) and the step (1-3) to support Mo. In this connection, it is preferable that, the respective amount of Mo involved in the two steps is so adjusted that the ratio by molar of the amount of Mo to be supported in the preceding step to the amount of that to be supported in the succeeding step reaches 0.4-2.5:1, preferably 0.4-2.0:1.

In the context of this specification, for a simplified description, in the following second to fourth producing process, unless otherwise specified, any unmentioned content/feature apply to those described hereinbefore in connection with the first producing process.

The Second Producing Process

The second producing process of this invention comprises at least the following steps (2-1) to (2-3).

Step (2-1): By saturated impregnation or oversaturated impregnation, onto a particulate porous refractory carrier, there is supported an adsorbent II.

According to this invention, the adsorbent II is a polyol having a number averaged molecular weight Mn (by the GPC method) of 400-10000, preferably a polyol having a number averaged molecular weight Mn (by the GPC method) of 1000-8000. As the polyol, for example, there may be exemplified polyether glycol or polyester glycol of this type. As the polyether glycol, for example, there may be exemplified polyethylene glycol, polypropylene glycol, polyglycerol, a copolymer of ethylene oxide and propylene oxide and the like, preferably polyethylene glycol.

According to this invention, the amount of the adsorbent II is generally 0.1-10 wt %, preferably 0.5-9.0 wt %, relative to the weight of the particulate porous refractory carrier.

According to this invention, to facilitate the saturated impregnation or oversaturated impregnation, the adsorbent II is preferably used in the form of wetting liquid (i.e. a solution containing the adsorbent II). As the solvent for the solution, for example, there may be exemplified water, ethanol and a mixture of water and ethanol at any ratio therebetween, but sometimes not limiting thereto.

According to this invention, the saturated impregnation or oversaturated impregnation may be conducted in any manner conventionally known in this field, without any specific limitation thereto, and therefore any explanations thereon in details are omitted herein. As the saturated impregnation, a saturated spray impregnation process is preferred, and in this connection, the spray impregnation duration is generally 5-40 min, preferably 10-20 min.

According to the second producing process, if needed or preferably, it is acceptable that after the completion of the step (2-1) while before the beginning of the following step (2-2), the product directly obtained from the step (2-1) is aged (hereinafter left stand) for 1-12 h (preferably 4-12 h) (referred to as aging step), or the product is dried at a temperature of 60-250 degrees Celsius (preferably 100-200 degrees Celsius) for 0.5-20 h (preferably 1-6 h) (referred to as drying step), or the product is firstly subject to the aging step, and then to the drying step. In this specification, the thus obtained product and the product directly obtained from the step (2-1) are indiscriminately and collectively referred to as "product obtained from the step (2-1)".

Step (2-2): Onto the product obtained from the step (2-1), the active metal component A, optionally the active metal component C and optionally the auxiliary component are supported. This means that, onto the product obtained from the step (2-1), there are supported the active metal component A, and optionally at the same time and/or subsequently the active metal component C and/or the auxiliary component. Preferably onto the product obtained from the step (2-1), the active metal component A and the active metal component C are simultaneously supported, and optionally at the same time, the auxiliary component is supported.

According to the second producing process, if needed or preferably, it is acceptable that after the completion of the step (2-2) while before the beginning of the following step (2-3), the product directly obtained from the step (2-2) is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h). In this specification, the thus obtained product and the product directly obtained from the step (2-2) are indiscriminately and collectively referred to as "product obtained from the step (2-2)".

Step (2-3): Before the beginning of the step (2-1) and/or after the completion of the step (2-2), onto the porous refractory carrier, the active metal component B, optionally the active metal component C and optionally the auxiliary component are supported. This means that, before the beginning of the step (2-1), onto the (particulate) porous refractory carrier, there are supported the active metal component B, and optionally precedently, simultaneously or subsequently the active metal component C and/or the auxiliary component, and preferably there are simultaneously supported the active metal component B and the active metal component C, and optionally precedently or simultaneously the auxiliary component, whereby obtaining a pre-treated porous refractory carrier (herein still referred to as porous refractory carrier); or, after the completion of the step (2-2), onto the product obtained from the step (2-2), there are supported (actually still onto the porous refractory carrier) the active metal component B, and optionally precedently, simultaneously or subsequently the active metal component C and/or the auxiliary component, and preferably there are simultaneously supported the active metal component B and the active metal component C, and optionally precedently or simultaneously the auxiliary component, whereby obtaining the hydrotreating catalyst of this invention; or a combination thereof.

According to the second producing process, if needed or preferably, it is acceptable that after the completion of the step (2-3), the product directly obtained from this step is aged for 0.5-6 h (preferably 0.5-4 h) or not aged, at a temperature of 70-200 degrees Celsius (preferably 100-160 degrees Celsius) dried for 0.5-20 h (preferably 1-6 h), then at a temperature of 300-750 degrees Celsius (preferably 400-650 degrees Celsius) calcinated for 0.5-20 h (preferably 1-6 h), and then subject to any succeeding step or the hydrotreating catalyst of this invention is obtained.

According to the second producing process, each of the aforesaid aging, drying or calcinating could be conducted in a manner conventionally known in this field, and if needed, may be conducted under inert (for example nitrogen gas) atmosphere or in air (preferably in air), without any specific limitation thereto.

According to the second producing process of this invention, there is no specific limitation as to the supporting method involved in the step (2-2) and the step (2-3), including the way in which and the amount at which the active metal component A, the active metal component C, the active metal component B and the auxiliary component are supported, and those specified and described in connection with the first producing process directly apply.

According to the second producing process, it is necessary to through at least one out of the step (2-2) and the step (2-3), support the active metal component C (corresponding to the essential component of this invention), preferably through a combination of the step (2-2) and the step (2-3), support the active metal component C.

According to the second producing process, when the active metal component C comprises Mo, it is preferably to through a combination of the step (2-3) and the step (2-2) support Mo. In this connection, it is preferable that, the respective amount of Mo involved in the two steps is so adjusted that the ratio by molar of the amount of Mo to be supported in the preceding step to the amount of Mo to be supported in the succeeding step reaches 0.4-2.5:1, preferably 0.4-2.0:1.

The Third Producing Process

The third producing process of this invention comprises at least the following steps (3-1) to (3-5).

Step (3-1): By unsaturated impregnation, onto a particulate porous refractory carrier, there is supported an adsorbent I, and optionally simultaneously an organic alcohol having a carbon number of 1-5. To this step, those specified and described in connection with the step (1-1) in the first producing process directly apply.

According to the third producing process, if needed or preferably, it is acceptable that after the completion of the step (3-1) while before the beginning of the following step (3-2), the product directly obtained from the step (3-1) is aged (i.e. left stand hereinafter) for 0.5-8 h (preferably 0.5-6 h) (referred to as aging step), or the product is dried at a temperature of 60-250 degrees Celsius (preferably 100-200 degrees Celsius) for 0.5-20 h (preferably 1-6 h) (referred to as drying step), or the product is firstly subject to the aging step, and then to the drying step. In this specification, the thus obtained product and the product directly obtained from the step (3-1) are indiscriminately and collectively referred to as "product obtained from the step (3-1)".

Step (3-2): Onto the product obtained from the step (3-1), there are supported the active metal component B, optionally the active metal component C and optionally the auxiliary component. This means that, onto the product obtained from the step (3-1), there are supported the active metal component B, and optionally at the same time and/or subsequently the active metal component C and/or the auxiliary component. Preferably onto the product obtained from the step (3-1), there are simultaneously supported the active metal component B and the active metal component C, and optionally at the same time the auxiliary component.

According to the third producing process, if needed or preferably, it is acceptable that after the completion of the step (3-2) while before the beginning of the following step (3-3), the product directly obtained from the step (3-2) is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h). In this specification, the thus obtained product and the product directly obtained from the step (3-2) are indiscriminately and collectively referred to as "product obtained from the step (3-2)".

Step (3-3): By saturated impregnation or oversaturated impregnation, onto the product obtained from the step (3-2), there is supported the adsorbent II. To this step, those specified and described in connection with the step (2-1) in the second producing process directly apply, with the only exception that the porous refractory carrier is replaced with the product obtained from the step (3-2).

According to the step (3-3), the amount of the adsorbent II is generally 0.1-10 wt %, preferably 0.5-9.0 wt %, relative to the weight of the particulate porous refractory carrier.

According to the third producing process, if needed or preferably, it is acceptable that after the completion of the step (3-3) while before the beginning of the following step (3-4), the product directly obtained from the step (3-3) is aged (i.e. left stand hereinafter) for 1-12 h (preferably 4-12 h) (referred to as aging step), or the product is dried at a temperature of 60-250 degrees Celsius (preferably 100-200 degrees Celsius) for 0.5-20 h (preferably 1-6 h) (referred to as drying step), or the product is firstly subject to the aging step, and then to the drying step. In this specification, the thus obtained product and the product directly obtained from the step (3-3) are indiscriminately and collectively referred to as "product obtained from the step (3-3)".

Step (3-4): Onto the product obtained from the step (3-3), there are supported the active metal component A, optionally the active metal component C and optionally the auxiliary component. This means that, onto the product obtained from the step (3-3), there are supported the active metal component A, and optionally at the same time and/or subsequently the active metal component C and/or the auxiliary component. Preferably onto the product obtained from the step (3-3), there are simultaneously supported the active metal component A and the active metal component C, and optionally at the same time the auxiliary component.

According to the third producing process, if needed or preferably, it is acceptable that after the completion of the step (3-4) while before the beginning of the following step (3-5), the product directly obtained from the step (3-4) is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h). In this specification, the thus obtained product and the product directly obtained from the step (3-4) are indiscriminately and collectively referred to as "product obtained from the step (3-4)".

Step (3-5): Optionally before the beginning of the step (3-1), after the completion of the step (3-2) while before the beginning of the step (3-3) and/or after the completion of the step (3-4), onto the porous refractory carrier, there are supported the active metal component C and optionally the auxiliary component. This means that, before the beginning of the step (3-1), onto the (particulate) porous refractory carrier, there are supported the active metal component C, and optionally precedently, simultaneously or subsequently the auxiliary component, whereby obtaining a pre-treated porous refractory carrier (still referred to as porous refractory carrier herein); or after the completion of the step (3-2) while before the beginning of the step (3-3), onto the product obtained from the step (3-2), there are supported (actually still onto the porous refractory carrier) the active metal component C, and optionally precedently, simultaneously or subsequently the auxiliary component, whereby obtaining a pre-treated product (herein still referred to as the product obtained from the step (3-2)); or after the completion of the step (3-4), onto the product obtained from the step (3-4), there are supported (actually still onto the porous refractory carrier) the active metal component C, and optionally precedently, simultaneously or subsequently the auxiliary component, whereby obtaining the hydrotreating catalyst of this invention; or a combination of the three ways.

According to the third producing process, if needed or preferably, it is acceptable that after the completion of the step (3-5), the product directly obtained from this step is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h), and then subject to any succeeding step or the hydrotreating catalyst of this invention is obtained.

According to the third producing process, each of the aforesaid aging, drying or calcinating could be conducted in a manner conventionally known in this field, and if needed, may be conducted under inert (for example nitrogen gas) atmosphere or in air (preferably in air), without any specific limitation thereto.

According to the third producing process of this invention, there is no specific limitation as to the supporting method involved in the step (3-2), the step (3-4) and the step (3-5), including the way in which and the amount at which the active metal component A, the active metal component C, the active metal component B and the auxiliary component are supported, and those specified and described in connection with the first producing process directly apply.

According to the third producing process, it is necessary to by at least one out of the step (3-2), the step (3-4) and the step (3-5) support the active metal component C (corresponding to the essential component of this invention), preferably to through a combination of the step (3-2) and the step (3-4) support the active metal component C.

According to the third producing process, when the active metal component C comprises Mo, it is preferably to through a combination of the step (3-2) and the step (3-4) support Mo.

In this connection, it is preferable that, the respective amount of Mo involved in the two steps is so adjusted that the ratio by molar of the amount of Mo to be supported in the preceding step to the amount of Mo to be supported in the succeeding step reaches 0.4-2.5:1, preferably 0.4-2.0:1.

The Fourth Producing Process

The fourth producing process of this invention comprises at least the following steps (4-1) to (4-5).

Step (4-1): By saturated impregnation or oversaturated impregnation, onto a particulate porous refractory carrier, there is supported the adsorbent II. To this step, those specified and described in connection with the step (2-1) in the second producing process directly apply.

According to the fourth producing process, if needed or preferably, it is acceptable that after the completion of the step (4-1) while before the beginning of the following step (4-2), the product directly obtained from the step (4-1) is aged (i.e. left stand hereinafter) for 1-12 h (preferably 4-12 h) (referred to as aging step), or the product is dried at a temperature of 60-250 degrees Celsius (preferably 100-200 degrees Celsius) for 0.5-20 h (preferably 1-6 h) (referred to as drying step), or the product is firstly subject to the aging step, and then to the drying step. In this specification, the thus obtained product and the product directly obtained from the step (4-1) are indiscriminately and collectively referred to as "product obtained from the step (4-1)".

Step (4-2): Onto the product obtained from the step (4-1), there are supported the active metal component A, optionally the active metal component C and optionally the auxiliary component. This means that, onto the product obtained from the step (4-1), there are supported the active metal component A, and optionally at the same time and/or subsequently the active metal component C and/or the auxiliary component. Preferably onto the product obtained from the step (4-1), there are simultaneously supported the active metal component A and the active metal component C, and optionally at the same time the auxiliary component.

According to the fourth producing process, if needed or preferably, it is acceptable that after the completion of the step (4-2) while before the beginning of the following step (4-3), the product directly obtained from the step (4-2) is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h). In this specification, the thus obtained product and the product directly obtained from the step (4-2) are indiscriminately and collectively referred to as "product obtained from the step (4-2)".

Step (4-3): By unsaturated impregnation, onto the product obtained from the step (4-2), there are supported the adsorbent I, and optionally simultaneously the organic alcohol having a carbon atom number of 1-5. To this step, those specified and described in connection with the step (1-1) in the first producing process directly apply, with the only exception that the porous refractory carrier is replaced with the product obtained from the step (4-2).

According to the step (4-3), the amount of the adsorbent I is generally 0.1-10 wt %, preferably 0.5-9.0 wt %, relative to the weight of the particulate porous refractory carrier. If used, the amount of the organic alcohol is generally 0.1-10 wt %, preferably 0.5-9.0 wt %, relative to the weight of the particulate porous refractory carrier.

According to the fourth producing process, if needed or preferably, it is acceptable that after the completion of the step (4-3) while before the beginning of the following step (4-4), the product directly obtained from the step (4-3) is aged (i.e. left stand hereinafter) for 0.5-8 h (preferably 0.5-6 h) (referred to as aging step), or the product is dried at a temperature of 60-250 degrees Celsius (preferably 100-200 degrees Celsius) for 0.5-20 h (preferably 1-6 h) (referred to as drying step), or the product is firstly subject to the aging step, and then to the drying step. In this specification, the thus obtained product and the product directly obtained from the step (4-3) are indiscriminately and collectively referred to as "product obtained from the step (4-3)".

Step (4-4): Onto the product obtained from the step (4-3), there are supported the active metal component B, optionally the active metal component C and optionally the auxiliary component. This means that, onto the product obtained from the step (4-3), there are supported the active metal component B, and optionally at the same time and/or subsequently the active metal component C and/or the auxiliary component. Preferably onto the product obtained from the step (4-3), there are simultaneously supported the active metal component B and the active metal component C, and optionally at the same time the auxiliary component.

According to the fourth producing process, if needed or preferably, it is acceptable that after the completion of the step (4-4) while before the beginning of the following step (4-5), the product directly obtained from the step (4-4) is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h). In this specification, the thus obtained product and the product directly obtained from the step (4-4) are indiscriminately and collectively referred to as "product obtained from the step (4-4)".

Step (4-5): Optionally before the beginning of the step (4-1), after the completion of the step (4-2) while before the beginning of the step (4-3) and/or after the completion of the step (4-4), onto the porous refractory carrier, there are supported the active metal component C and optionally the auxiliary component. This means that, before the beginning of the step (4-1), onto the (particulate) porous refractory carrier, there are supported the active metal component C, and optionally precedently, simultaneously or subsequently the auxiliary component, whereby obtaining a pre-treated porous refractory carrier (herein still referred to as porous refractory carrier); or, after the completion of the step (4-2)

while before the beginning of the step (4-3), onto the product obtained from the step (4-2), there are supported (actually still onto the porous refractory carrier) the active metal component C, and optionally precedently, simultaneously or subsequently the auxiliary component, whereby obtaining a pre-treated product (herein still referred to as the product obtained from the step (4-2)); or, after the completion of the step (4-4), onto the product obtained from the step (4-4), there are supported (actually still onto the porous refractory carrier) the active metal component C, and optionally precedently, simultaneously or subsequently the auxiliary component, whereby obtaining the hydrotreating catalyst of this invention; or any combination thereof.

According to the fourth producing process, if needed or preferably, it is acceptable that after the completion of the step (4-5), the product directly obtained from this step is aged for 0.5-6 h (preferably 0.5-4 h) or not aged, dried at a temperature of 70-200 degrees Celsius (preferably 100-160 degrees Celsius) for 0.5-20 h (preferably 1-6 h), then calcinated at a temperature of 300-750 degrees Celsius (preferably 400-650 degrees Celsius) for 0.5-20 h (preferably 1-6 h), and then subject to any succeeding step or the hydrotreating catalyst of this invention is obtained.

According to the fourth producing process, each of the aforesaid aging, drying or calcinating could be conducted in a manner conventionally known in this field, and if needed, may be conducted under inert (for example nitrogen gas) atmosphere or in air (preferably in air), without any specific limitation thereto.

According to the fourth producing process of this invention, there is no specific limitation as to the supporting method involved in the step (4-2), the step (4-4) and the step (4-5), including the way in which and the amount at which the active metal component A, the active metal component C, the active metal component B and the auxiliary component are supported, and those specified and described in connection with the first to the third producing processes directly apply.

According to the fourth producing process, it is necessary to by at least one out of the step (4-2), the step (4-4) and the step (4-5) support the active metal component C (corresponding to the essential component of this invention), preferably through a combination of the step (4-2) and the step (4-4) support the active metal component C.

According to the fourth producing process, when the active metal component C includes Mo, it is preferably to through a combination of the step (4-4) and the step (4-2) support Mo. In this connection, it is preferable that, the respective amount of Mo involved in the two steps is so adjusted that the ratio by molar of the amount of Mo to be supported in the preceding step to the amount of Mo to be supported in the succeeding step reaches 0.4-2.5:1, preferably 0.4-2.0:1.

According to this invention, as a rule conventionally known in this field, the hydrotreating catalyst may sometimes if needed be pre-sulfurated by sulfur, hydrogen sulfide or a sulfur-containing feed stock or the like in the presence of hydrogen gas before use, and this pre-sulfuration may be conducted outside the reactor or inside the reactor as in-situ sulfuration, whereby converting same into a sulfide type. The pre-sulfuration technology has been well known in this field, with description thereon in details omitted herein.

This invention further relates to use of the hydrotreating catalyst in hydrodesulfurization (especially deep hydrodesulfurization) of heavy distillate oils (especially diesel oil) as a hydrodesulfurization catalyst.

According to this invention, as the heavy distillate oil, for example, there may be exemplified diesel oil and wax oil, preferably diesel oil. It is known that, the heavy distillate oil has a total sulfur content of generally 0.3-3.0 wt %, preferably 0.3-2.5 wt %, wherein the sulfur content originated from the hardly desulfurizating compounds (as 4,6-dimethyl dibenzothiophene) is about 0.01 wt % or more, generally 0.01-0.05 wt %.

According to this invention, by using the present hydrotreating catalyst as the hydrodesulfurization catalyst, it is possible to lower the total sulfur content of the heavy distillate oil to the level of 0.05 wt % or less, preferably 0.005 wt % or less, and especially 80 wt % or more (preferably 90 wt % or more) of the hardly desulfurizating compounds can be removed.

According to this invention, as the use, for example, there may be exemplified a method wherein a heavy distillate oil feed stock contacts the hydrotreating catalyst of this invention under hydrodesulfurization conditions, also referred to as hydrodesulfurization of heavy distillate oil.

According to this invention, in the use or the hydrodesulfurization, it is acceptable to use the hydrotreating catalyst of this invention as the only hydrotreating catalyst, or co-use the hydrotreating catalyst of this invention with other hydrotreating catalyst (for example, those known in the prior art) at any ratio therebetween if needed as a composite hydrotreating catalyst.

According to this invention, there is no specific limitation as to the hydrodesulfurization conditions, which may be those conventionally known in this field, for example, there may be exemplified a reaction temperature of 260-400 degrees Celsius, preferably 310-370 degrees Celsius, a total reaction pressure of 3-13 MPa, preferably 5-9 MPa, a liquid hourly space velocity of 0.5-4 $h^{-1}$, preferably 1-2 $h^{-1}$, a hydrogen/oil ratio by volume of 200:1-2000:1, preferably 400:1-1000:1.

EXAMPLE

The following examples illustrate rather than limit this invention.

Measurement (1) The Content (Wt %) of the Active Metal Component a, the Active Metal Component B, the Active Metal Component C and the Auxiliary Component The respective content (wt %) of the active metal component A, the active metal component B, the active metal component C and the auxiliary component in a catalyst particle was measured by X ray fluorescence spectrometry.

(2) The Content (Wt %) of the Porous Refractory Carrier

The content (wt %) of the porous refractory carrier in a catalyst particle was calculated on the basis of the actual feeding ratio.

(3) The Specific Surface Area ($m^2/g$) and the Pore Volume (ml/g)

The specific surface area ($m^2/g$) and the pore volume (ml/g) of a catalyst particle and those of a carrier particle were measured by the BET method.

(4) The Bulk Density (g/100 ml)

The bulk density (g/100 ml) of the porous refractory carrier was measured by the mechanical tapping method.

(5) The Saturated Liquid Absorption (ml/100 g)

100 g of the particulate porous refractory carrier was weighted and placed into a separating funnel, and then there was added 300 ml purified water, such that the water level went above the physical surface of the carrier mass, left stand for 30 min, and then excessive water was discharged into a graduated cylinder to measure the volume L of the excessive water. In this connection, the saturated liquid absorption was calculated by (300−L)÷100 (ml/100 g).

(6) The Concentration Distribution of Each Active Metal Component in a Catalyst Particle In the following examples and comparative examples, a cylindrical carrier (obviously, this invention is not limited thereto, and other shape may be used as well) was illustrated, and therefore the obtained catalyst particle was also of the cylindrical shape.

First of all, one catalyst particle was randomly selected from the catalyst particles obtained by each example or each comparative example as the measurement sample, and then in the direction perpendicular to the length dimension of the cylindrical particle, cut the measurement sample apart through the central point of the length dimension (as schematically illustrated in FIG. 1($b$)), to obtain two exposed surfaces. One out of the two exposed surfaces was taken as the measurement cross-section.

The measurement cross-section was measured by the EPMA method, in accordance with GB/T15074-2008, on an electron probe microanalyzer (Model JXA-8230, from JEOL LTD.). The measurement conditions were: an acceleration voltage of 15 kV, a beam intensity of $5\times10^{-8}$ A, a beam diameter of 1 μm, an X ray detection angle (°) of: 53° for W, 38° for Mo, 24° for Ni, 26° for Co, with a ZAF calibration, a pure metal oxide (NiO, CoO, $WO_3$ and $MoO_3$ respectively) as the standard sample, an accuracy of less than 1%, a secondary electron image resolution of 3 nm ($LaB_6$), line series: the $M_\alpha$ line for W, the $L_\alpha$ line for Mo, the $K_\alpha$ line for Co and Ni. The measurement included: at the outmost edge of the cross-section, a position point was randomly selected as "out", while the central point of the cross-section was taken as "center", and a line segment was depicted to connect the position point "out" and the position point "center" (actually corresponding to the radius of the cross-section), and along the line segment (i.e. in the radial direction), the concentration of an active metal component in concern at a predetermined position point was measured, and then by a simple division calculation, to obtain the ratio (ratio by molar herein) of different concentrations.

The concentration distribution illustrated in each of FIG. 2 to FIG. 5 was obtained by a method wherein 21 position points (including the position point "out" and the position point "center") were uniformly selected from the line segment, and plotted by using the position point as the X-axis and using the ratio of the concentration of an active metal component in concern (illustrated as Ni and Co) measured at each position point to the concentration of the active metal component measured at the position point "center" (for example, as $C^{Ni}$ and $C^{Co}$ respectively) as the Y-axis.

(7) The Relative Desulfuration Activity (%) of a Catalyst

The relative desulfuration activity (%) of a catalyst was calculated on the basis of the following formula.

Relative desulfuration activity=$100\times[(1/S_1)^{0.65}-(1/S_0)^{0.65}]/[(1/Sc_1)^{0.65}-(1/S_0)^{0.65}]$ In this formula, $S_1$ and $Sc_1$ represented the total sulfur content of a hydrogenation product resulted from the hydrogenation of an oil feedstock in the presence of the hydrotreating catalyst of this invention and that resulted in the presence of the hydrotreating catalyst of a comparative example respectively, and $S_0$ represented the total sulfur content of the oil feedstock (based on S, with a unit of μg/g).

(8) The Sulfur Content

The total sulfur content S (wt %) of the oil feedstock and that of the hydrogenation product were measured by the ultraviolet fluorescence method (ASTM D5453-1993).

The content (μg/g) of the hardly desulfurizing compounds (as 4,6-BMDBT) in the oil feedstock and that in the hydrogenation product were measured by gas-chromatography-atomic emission detection (GC-AED).

Example I

This example took a cylindrical alumina carrier as the particulate porous refractory carrier, which was prepared by a method wherein 400 g pseudo boehmite dry powder was weighted, there were added 8 g citric acid and 8 g sesbania powder, after mixed till homogeneous, there was added 345 g of an acidic solution, which had a $HNO_3$ concentration by weight of 3.2%, kneaded for 20 min, rolled for 20 min, and then on an extruder extruded into a cylindrical carrier, which was dried at 120 degrees Celsius for 4 h and then calcinated at 500 degrees Celsius for 4 h, to obtain the alumina carrier A of this invention, which had a diameter of about 1.2 mm, a length of about 3-5 mm, and exhibited physicochemical properties as illustrated in Table I-1.

TABLE I-1

Physicochemical properties of the alumina carrier A used in Examples and Comparative Examples

| Items | alumina carrier A |
|---|---|
| the specific surface area, $m^2/g$ | 298 |
| the pore volume, mL/g | 0.64 |
| the bulk density, g/100 ml | 63 |
| the saturated liquid absorption, ml/100 g | 75 |

In the Mo—Ni—P impregnating liquid and the Mo—Co—P impregnating liquid of this example, the Mo precursor was $MoO_3$, the Ni precursor was basic nickel carbonate, the Co precursor was basic cobalt carbonate, the P precursor was phosphoric acid.

Example I-1

1.6 g citric acid was weighted, and dissolved under stirring in 15 g water, to obtain a wetting liquid. 100 g of the alumina carrier A was weighted, and the wetting liquid was evenly sprayed onto the alumina carrier A, with a spraying duration of 10 min, after the completion of the spraying of the wetting liquid, to obtain a sample. The same procedure as aforesaid was repeated to prepare three batches of sample. After the completion of the spraying of the wetting liquid, the first batch was directly at 100 degrees Celsius dried for 2 h, the carrier was impregnated with 70 mL of the Mo—Co—P containing impregnating liquid (referred to as the first Mo containing impregnating liquid, hereinafter) by incipient wetness impregnation, and then dried at 120 degrees Celsius for 3 h, calcinated at 480 degrees Celsius for 2 h, to obtain a semi-product named as B1; After the completion of the spraying of the wetting liquid, the second batch was aged for 1 h, and subject to the same post-treatment as that for the catalyst B1, to obtain a semi-product named as B2; After the completion of the spraying of the wetting liquid, the third batch was aged for 5 h, and subject to the same post-treatment as that for the catalyst B1, to obtain a semi-product named as B3.

The B1, B2 and B3 were respectively impregnated with 69 mL of the Mo—Ni—P containing impregnating liquid (referred to as the second Mo containing impregnating liquid, hereinafter) by incipient wetness impregnation, and then dried at 120 degrees Celsius for 3 h, calcinated at 480 degrees Celsius for 2 h, to obtain a catalyst named as C1, C2 and C3 respectively.

Example I-2

0.8 g oxalic acid was weighted, and dissolved under stirring in 4 g ethanol, to obtain a wetting liquid. 100 g of the alumina carrier A was weighted, and the wetting liquid was evenly sprayed onto the alumina carrier A, with a spraying duration of 4 min. After the completion of the spraying of the wetting liquid, the obtained product was aged for 0.5 h. The carrier was impregnated with 70 mL of the Mo—Co—P containing impregnating liquid by incipient wetness impregnation, and then dried at 120 degrees Celsius for 3 h, calcinated at 480 degrees Celsius for 2 h, to obtain a semi-product named as B4.

The B4 was impregnated with 69 mL of the Mo—Ni—P containing impregnating liquid by incipient wetness impregnation, and then dried at 120 degrees Celsius for 3 h, calcinated at 480 degrees Celsius for 2 h, to obtain a catalyst named as C4.

Example I-3

6 g malonic acid was weighted, and dissolved under stirring in 20 g water, to obtain a wetting liquid. 100 g of the alumina carrier A was weighted, and the wetting liquid was evenly sprayed onto the alumina carrier A, with a spraying duration of 25 min. After the completion of the spraying of the wetting liquid, the obtained product was aged for 1 h. The carrier was impregnated with 53 mL of the Mo—Co—P containing impregnating liquid by incipient wetness impregnation, and then dried at 120 degrees Celsius for 3 h, calcinated at 480 degrees Celsius for 2 h, to obtain a semi-product named as B5.

The B5 was impregnated with 69 mL of the Mo—Ni—P containing impregnating liquid by incipient wetness impregnation, and then dried at 120 degrees Celsius for 3 h, calcinated at 480 degrees Celsius for 2 h, to obtain a catalyst named as C5.

Comparative Example I-1

100 g of the alumina carrier A was weighted, impregnated with 75 mL of the Mo—Co—P containing impregnating liquid by incipient wetness impregnation, and then dried at 120 degrees Celsius for 3 h, calcinated at 480 degrees Celsius for 2 h, to obtain a semi-product named as B6. The B6 was impregnated with 69 mL of the Mo—Ni—P containing impregnating liquid by incipient wetness impregnation, and then dried at 120 degrees Celsius for 3 h, calcinated at 480 degrees Celsius for 2 h, to obtain a catalyst named as C6.

TABLE I-2

The composition of the Example catalyst and the Comparative Example catalyst

| composition | C1 | C2 | C3 | C4 | C5 | C6 |
|---|---|---|---|---|---|---|
| MoO₃, wt % | 25.2 | 25.5 | 25.4 | 25.3 | 25.6 | 25.5 |
| CoO, wt % | 2.4 | 2.3 | 2.4 | 2.4 | 2.4 | 2.3 |
| NiO, wt % | 2.6 | 2.5 | 2.6 | 2.6 | 2.5 | 2.5 |
| P₂O₅, wt % | 2.8 | 2.7 | 2.7 | 2.8 | 2.8 | 2.8 |
| alumina | the remaining | the remaining | the remaining | the remaining | the remaining | the remaining |
| the ratio by molar of Mo in the first Mo containing impregnating liquid to that in the second Mo containing impregnating liquid | 1.0 | 1.0 | 1.0 | 0.8 | 1.2 | 1.0 |

TABLE I-3

The concentration distribution of Mo in the radial direction on the cross-section of the catalyst (semi-product) particle obtained from the Example and the Comparative Example

| catalyst No. | B1 | B2 | B3 | B4 | B5 | B6 |
|---|---|---|---|---|---|---|
| $C^{Mo}_{out}$ | 0.13 | 0.28 | 0.55 | 0.35 | 0.28 | 1.01 |
| $C^{Mo}_{1/4}$ | 0.32 | 0.42 | 0.62 | 0.47 | 0.38 | 0.99 |
| $C^{Mo}_{1/2}$ | 0.67 | 0.79 | 0.86 | 0.86 | 0.78 | 1.0 |
| $C^{Mo}_{3/4}$ | 0.89 | 0.94 | 0.96 | 0.98 | 0.95 | 1.01 |

TABLE I-4

The concentration distribution of Mo in the radial direction on the cross-section of the catalyst particle obtained from the Example and the Comparative Example

| catalyst No. | C1 | C2 | C3 | C4 | C5 | C6 |
|---|---|---|---|---|---|---|
| $C^{Mo}_{out}$ | 0.56 | 0.65 | 0.77 | 0.72 | 0.61 | 0.99 |
| $C^{Mo}_{1/4}$ | 0.66 | 0.71 | 0.82 | 0.78 | 0.68 | 1.01 |
| $C^{Mo}_{1/2}$ | 0.83 | 0.89 | 0.92 | 0.95 | 0.88 | 0.98 |
| $C^{Mo}_{3/4}$ | 0.95 | 0.97 | 0.98 | 0.99 | 0.97 | 1.00 |

TABLE I-5

The concentration distribution of Co (the active metal component B) in the radial direction on the cross-section of the catalyst particle obtained from the Example and the Comparative Example

| catalyst No. | C1 | C2 | C3 | C4 | C5 | C6 |
|---|---|---|---|---|---|---|
| $C^{B}_{out}$ | 0.14 | 0.26 | 0.50 | 0.31 | 0.23 | 0.98 |
| $C^{B}_{1/4}$ | 0.30 | 0.44 | 0.61 | 0.80 | 0.40 | 0.99 |
| $C^{B}_{1/2}$ | 0.64 | 0.78 | 0.85 | 0.96 | 0.70 | 1.02 |
| $C^{B}_{3/4}$ | 0.92 | 0.94 | 0.98 | 0.99 | 0.90 | 1.01 |

TABLE I-6

The concentration distribution of Ni (the active metal component A) in the radial direction on the cross-section of the catalyst particle obtained from the Example and the Comparative Example

| catalyst No. | C1 | C2 | C3 | C4 | C5 | C6 |
|---|---|---|---|---|---|---|
| $C^{A}_{out}$ | 1.0 | 1.01 | 0.99 | 1.02 | 1.01 | 1.01 |
| $C^{A}_{1/4}$ | 1.02 | 1.02 | 0.98 | 1.0 | 1.0 | 0.99 |
| $C^{A}_{1/2}$ | 1.01 | 1.00 | 1.01 | 0.99 | 0.99 | 1.0 |
| $C^{A}_{3/4}$ | 0.99 | 1.01 | 1.0 | 1.0 | 1.02 | 0.98 |

As can be seen from Table I-2, Table I-3, Table I-4 and Table I-5, according to the present inventive catalysts C1 to C5, the concentration of the active metal components Mo and Co gradually increased in the radial direction from the outmost edge to the central point on the cross-section of the catalyst particle, while according to the comparative catalyst C6, the concentration of the active metal components Mo and Co remained substantially the same at any position in the radial direction, not like the catalyst of this invention which obviously took on a gradient distribution. The C1, C2 and C3 revealed that by adjusting the aging duration after the completion of the spraying of the wetting liquid, it was possible to adjust the concentration distribution of an active metal component in the radial direction on the cross-section of the catalyst particle. As can be seen from the C2, C4 and C5, by changing the volume of the wetting liquid, it was further possible to adjust the concentration distribution of the active metal components Mo and Co in the radial direction on the cross-section of the catalyst particle. In view of this, according to the catalyst obtained with the present inventive process, as compared with the comparative catalyst, it was easier to adjust the concentration distribution of an active metal component in the radial direction on the cross-section of the catalyst particle, such that the concentration of Mo and Co (which exhibit a higher hydrodesulfurization activity) got increased the closer to the central point of the cross-section, and in this context, during the diffusion of a reactant molecule into the central point of the catalyst particle, it was firstly saturated by hydrogenation, and then reacted at the Mo/Co sites, which exhibit a higher direct desulfuration activity, whereby bettering the deep desulfuration performances of the catalyst.

Example I-4

This example illustrates the activity evaluation experiment of a catalyst.

The catalyst activity evaluation experiment was performed on a 100 ml small-scale hydrogenation unit, and the catalyst was subject to a pre-sulfuration prior to the activity evaluation. The catalyst evaluation conditions included a total reaction pressure of 6.0 MPa, a liquid hourly space velocity of 2.0 $h^{-1}$, a hydrogen/oil ratio of 500:1, a reaction temperature of 340 degrees Celsius. The properties of the oil feedstock for the activity evaluation experiment were listed in Table I-7, and the activity evaluation results were listed in Table I-8 and I-9, which data revealed that, the hydrotreating catalyst, if produced in line with the present inventive process, exhibited a desulfuration activity significantly greater than that of the comparative example catalyst.

TABLE I-7

Properties of the oil feedstock

| oil feedstock | diesel oil fraction |
|---|---|
| density (20 degrees Celsius), g/cm³ | 0.8533 |
| distillation range, degrees Celsius | |
| IBP | 217 |
| EBP | 375 |
| S, wt % | 1.78 |
| N, µg/g | 140 |

TABLE I-8

The catalyst activity evaluation results

| catalyst | C1 | C2 | C3 | C4 | C5 | C6 |
|---|---|---|---|---|---|---|
| relative desulfuration activity, % | 127 | 136 | 131 | 126 | 138 | 100 |

TABLE I-9

The content of hardly desulfurizating compounds in the oil feedstock and that in the hydrogenation product

| | oil feedstock | C1 | C2 | C3 | C4 | C5 | C6 |
|---|---|---|---|---|---|---|---|
| 4,6- BMDBT, µg/g | 215 | 15.9 | 14.6 | 15.3 | 16.1 | 14.0 | 23.1 |

In the first line of Table I-9, the symbol C1 represented the hydrogenation product obtained by treating the oil feedstock in the presence of the catalyst C1 as the hydrotreating catalyst, and other symbols were to be understood in a similar way.

Example II

In the following examples, a cylindrical alumina carrier was used as the particulate porous refractory carrier, which was prepared by a method wherein 400 g pseudo boehmite dry powder was weighted, there were added 8 g citric acid and 8 g sesbania powder, mixed till homogeneous, there was added 345 g of an acidic solution, which had a $HNO_3$ concentration by weight of 3.0%, kneaded for 20 min, rolled for 20 min, and then on an extruder extruded into a carrier of cylindrical shape, which was dried at 120 degrees Celsius for 4 h and then calcinated at 500 degrees Celsius for 4 h, to obtain the alumina carrier B of this invention, which had a diameter of about 1.2 mm, a length of about 3-5 mm, and exhibited physicochemical properties as illustrated in Table II-1.

TABLE II-1

The physicochemical properties of the alumina carrier B used in the examples

| items | alumina carrier B |
|---|---|
| the specific surface area, m²/g | 303 |
| the pore volume, mL/g | 0.64 |
| the bulk density, g/100 ml | 63 |
| the saturated liquid absorption, ml/100 g | 75 |

In the Mo—Ni—P impregnating liquid and the Mo—Co—P impregnating liquid of this example, the Mo precursor was $MoO_3$, the Ni precursor was basic nickel carbonate, the Co precursor was basic cobalt carbonate, the P precursor was phosphoric acid.

Example II-1

5 g tartaric acid was weighted, and dissolved under stirring in 15 g water, to obtain a wetting liquid I. 100 g of the alumina carrier B was weighted, and the wetting liquid I was evenly spray impregnated onto the alumina carrier B, with a spray impregnation duration of 15 min, after the completion of the spray impregnation of the wetting liquid I, to obtain a sample. The same procedure as aforesaid was repeated to prepare three batches of sample. After the completion of the spray impregnation of the wetting liquid I, the first batch was dried at 100 degrees Celsius for 2 h, the carrier was impregnated with 69 mL of the Mo—Co—P containing impregnating liquid (hereinafter referred to as the first Mo containing impregnating liquid) by incipient wetness impregnation, not aged, and dried at 120 degrees Celsius for 3 h, calcinated at 480 degrees Celsius for 2 h, to obtain a sample named as B1; The second batch was aged for 1 h, and subject to the same post-treatment as that for the catalyst semi-product B1, to obtain a sample named as B2; The third batch was aged for 3 h, and subject to the same post-treatment as that for the catalyst semi-product B1, to obtain a sample named as B3.

6 g polyethylene glycol 2000 (hereinafter polyethylene glycol having a molecular weight of 2000) was weighted, and dissolved under stirring in 58 mL water, to obtain a wetting liquid II. The samples B1, B2 and B3 were respectively impregnated with the wetting liquid II by incipient wetness impregnation, and then aged for 10 h, dried at 120 degrees Celsius for 3 h, to obtain a sample named respective as Z1, Z2 and Z3.

The samples Z1, Z2 and Z3 were respectively spray impregnated with 51 mL of the Mo—Ni—P containing impregnating liquid (referred to as the second Mo containing impregnating liquid, hereinafter) by incipient wetness impregnation, after the completion of the spray impregnation, not aged, and directly dried at 120 degrees Celsius for 3 h, calcinated at 480 degrees Celsius for 2 h, to obtain a catalyst named respectively as C1, C2 and C3.

Example II-2

1.0 g malic acid was weighted, and dissolved under stirring in 6 g ethanol, to obtain a wetting liquid I. 100 g of the alumina carrier B was weighted, and the wetting liquid I was evenly spray impregnated onto the alumina carrier B, with a spray impregnation duration of 5 min. The carrier was impregnated with 67.5 mL of the Mo—Co—P containing impregnating liquid by incipient wetness impregnation, and after the completion of the impregnation, aged for 1 h, and then dried at 120 degrees Celsius for 3 h, calcinated at 480 degrees Celsius for 2 h, to obtain a sample named as B4.

8 g polyethylene glycol 1000 was weighted, and dissolved under stirring in 59 mL water, to obtain a wetting liquid II. The sample B4 was impregnated with the wetting liquid II by incipient wetness impregnation, and then aged for 5 h, dried at 120 degrees Celsius for 3 h, to obtain a sample named as Z4.

The sample Z4 was spray impregnated with 52 mL of the Mo—Ni—P containing impregnating liquid by incipient wetness impregnation, after the completion of the spray impregnation, to obtain a sample. Three batches of sample were obtained in the same way. The first batch was directly dried at 120 degrees Celsius for 3 h, calcinated at 480 degrees Celsius for 2 h, to obtain a catalyst named as C4; After the completion of the spray impregnation, the second batch was aged for 1 h, and subject to the same post-treatment as that for the catalyst C4, to obtain a catalyst named as C5; After the completion of the spray impregnation, the third batch was aged for 3 h, and subject to the same post-treatment as that for the catalyst C4, to obtain a catalyst named as C6.

Example II-3

3.5 g citric acid and 3.5 g malonic acid were weighted, and dissolved under stirring in 20 g water, to obtain a wetting liquid I. 100 g of the alumina carrier B was weighted, and the wetting liquid I was evenly spray impregnated onto the alumina carrier B, with a spray impregnation duration of 25 min. The carrier was impregnated with 53 mL of the Mo—Co—P containing impregnating liquid by incipient wetness impregnation, and after completion of the impregnation aged for 1 h, and then dried at 120 degrees Celsius for 3 h, calcinated at 480 degrees Celsius for 2 h, to obtain a sample named as B7.

2 g polyethylene glycol 8000 was weighted, and dissolved under stirring in 57 mL water, to obtain a wetting liquid II. 100 g of the sample B7 was impregnated with the wetting liquid II by incipient wetness impregnation, and then aged for 5 h, dried at 120 degrees Celsius for 3 h, to obtain a sample named as Z7.

The sample Z7 was spray impregnated with 51 mL of the Mo—Ni—P containing impregnating liquid by incipient wetness impregnation, and then directly dried at 120 degrees Celsius for 3 h, calcinated at 480 degrees Celsius for 2 h, to obtain a catalyst named as C7.

Comparative Example II-1

100 g of the alumina carrier B was weighted, the carrier was impregnated with 75 mL of the Mo—Co—P containing impregnating liquid by incipient wetness impregnation, and then dried at 120 degrees Celsius for 3 h, calcinated at 480 degrees Celsius for 2 h, to obtain a sample named as B8. The sample B8 was impregnated with 69 mL of the Mo—Ni—P containing impregnating liquid by incipient wetness impregnation, and then dried at 120 degrees Celsius for 3 h, calcinated at 480 degrees Celsius for 2 h, to obtain a catalyst named as C8.

TABLE II-2

The composition of the example catalyst and the comparative example catalyst

| composition | catalyst No. | | | | | | | |
| --- | --- | --- | --- | --- | --- | --- | --- | --- |
| | C1 | C2 | C3 | C4 | C5 | C6 | C7 | C8 |
| $MoO_3$, wt % | 23.4 | 23.1 | 23.3 | 22.9 | 23.2 | 23.5 | 23.1 | 23.5 |
| CoO, wt % | 2.1 | 2.1 | 2.0 | 2.0 | 2.1 | 2.2 | 2.0 | 2.1 |
| NiO, wt % | 2.5 | 2.7 | 2.5 | 2.4 | 2.6 | 2.5 | 2.5 | 2.6 |

TABLE II-2-continued

The composition of the example catalyst and the comparative example catalyst

| composition | catalyst No. | | | | | | | |
|---|---|---|---|---|---|---|---|---|
| | C1 | C2 | C3 | C4 | C5 | C6 | C7 | C8 |
| $P_2O_5$, wt % | 2.4 | 2.5 | 2.5 | 2.4 | 2.4 | 2.5 | 2.4 | 2.5 |
| $Al_2O_3$, wt % | the remaining | the remaining | the remaining | the remaining | the remaining | the remaining | the remaining | the remaining |
| the ratio by molar of Mo in the first Mo containing impregnating liquid to that in the second Mo containing impregnating liquid | 1.0 | 1.0 | 1.0 | 0.8 | 0.8 | 0.8 | 1.2 | 1.0 |
| properties | | | | | | | | |
| the specific surface area, $m^2/g$ | 175 | 173 | 176 | 174 | 177 | 172 | 175 | 176 |
| the pore volume, mL/g | 0.35 | 0.36 | 0.35 | 0.36 | 0.36 | 0.35 | 0.36 | 0.36 |

TABLE II-3

The concentration distribution of Co (the active metal component B) in the radial direction on the cross-section of the catalyst particle obtained from the Example and the Comparative Example

| catalyst No. | C1 | C2 | C3 | C4 | C5 | C6 | C7 | C8 |
|---|---|---|---|---|---|---|---|---|
| $C^B_{out}$ | 0.14 | 0.28 | 0.53 | 0.31 | 0.34 | 0.33 | 0.30 | 0.98 |
| $C^B_{1/4}$ | 0.29 | 0.47 | 0.63 | 0.79 | 0.78 | 0.81 | 0.46 | 0.99 |
| $C^B_{1/2}$ | 0.62 | 0.82 | 0.89 | 0.96 | 0.97 | 0.95 | 0.80 | 1.00 |
| $C^B_{3/4}$ | 0.91 | 0.95 | 0.98 | 0.99 | 0.98 | 1.00 | 0.94 | 0.99 |

TABLE II-4

The concentration distribution of Ni (the active metal component A) in the radial direction on the cross-section of the catalyst particle obtained from the Example and the Comparative Example

| | catalyst No. | | | | | | | |
|---|---|---|---|---|---|---|---|---|
| | C1 | C2 | C3 | C4 | C5 | C6 | C7 | C8 |
| $C^A_{out}$ | 2.79 | 2.81 | 2.82 | 2.99 | 2.48 | 2.08 | 2.51 | 1.00 |
| $C^A_{1/4}$ | 1.88 | 1.85 | 1.86 | 1.92 | 1.68 | 1.51 | 1.70 | 1.01 |
| $C^A_{1/2}$ | 1.26 | 1.25 | 1.28 | 1.30 | 1.22 | 1.17 | 1.20 | 0.99 |
| $C^A_{3/4}$ | 1.09 | 1.10 | 1.11 | 1.10 | 1.07 | 1.04 | 1.06 | 0.98 |

TABLE II-5

The concentration distribution of Ni/Mo in the radial direction on the cross-section of the catalyst particle obtained from the Example and the Comparative Example

| catalyst No. | C1 | C2 | C3 | C4 | C5 | C6 | C7 | C8 |
|---|---|---|---|---|---|---|---|---|
| Ni/Mo (the outmost surface) | 0.41 | 0.39 | 0.38 | 0.42 | 0.39 | 0.37 | 0.40 | 0.21 |
| Ni/Mo (¼ position point) | 0.28 | 0.28 | 0.29 | 0.30 | 0.29 | 0.30 | 0.28 | 0.22 |
| Ni/Mo (½ position point) | 0.22 | 0.22 | 0.23 | 0.21 | 0.22 | 0.22 | 0.21 | 0.20 |
| Ni/Mo (¾ position point) | 0.17 | 0.18 | 0.18 | 0.15 | 0.16 | 0.17 | 0.17 | 0.21 |
| Ni/Mo (the central point) | 0.15 | 0.16 | 0.16 | 0.14 | 0.14 | 0.16 | 0.15 | 0.22 |

TABLE II-6

The concentration distribution of Co/Mo in the radial direction on the cross-section of the catalyst particle obtained from the Example and the Comparative Example

| catalyst No. | C1 | C2 | C3 | C4 | C5 | C6 | C7 | C8 |
|---|---|---|---|---|---|---|---|---|
| Co/Mo (the outmost surface) | 0.05 | 0.08 | 0.11 | 0.07 | 0.06 | 0.06 | 0.07 | 0.18 |
| Co/Mo (¼ position point) | 0.12 | 0.15 | 0.16 | 0.16 | 0.17 | 0.18 | 0.11 | 0.18 |
| Co/Mo (½ position point) | 0.28 | 0.26 | 0.22 | 0.27 | 0.28 | 0.28 | 0.23 | 0.17 |
| Co/Mo (¾ position point) | 0.34 | 0.31 | 0.27 | 0.29 | 0.30 | 0.30 | 0.28 | 0.17 |
| Co/Mo (the central point) | 0.38 | 0.34 | 0.29 | 0.31 | 0.32 | 0.31 | 0.33 | 0.18 |

As can be seen from Table II-3 and Table II-4, according to the present inventive catalysts C1 to C7, the concentration of the active metal component Co gradually increased in the radial direction from the outmost edge to the central point on the cross-section of the catalyst particle, and the concentration of the active metal component Ni gradually decreased in the radial direction from the outmost edge to the central point on the cross-section of the catalyst particle, while according to the comparative catalyst C8, the concentration of the active metal components Co, Ni remained substantially the same at any position in the radial direction, not like the catalyst of this invention, which obviously took on a gradient distribution. The C1, C2 and C3 revealed that by adjusting the aging duration after the spray impregnation with the wetting liquid I, it was possible to adjust the concentration distribution of the active metal component Co in the radial direction on the cross-section of the catalyst particle; As can be seen from the C2, C6 and C7, by changing the content of the wetting liquid I, it was further possible to adjust the concentration distribution of the active metal component Co in the radial direction on the cross-section of the catalyst particle; As can be seen from the C4, C5, C6 and C7, by adjusting the content of the wetting liquid II and the aging duration after the spray impregnation by Mo—Ni—P, it was possible to adjust the concentration distribution of the active metal component Ni in the radial direction on the cross-section of the catalyst particle. In view of this, it was easier for the present inventive process to adjust the concentration distribution of an active metal component in the radial direction on the cross-section of the catalyst particle, such that the concentration of Mo/Ni (which exhibit better aromatics saturation performances) got increased the closer to the edge of the cross-section, while the concentration of Mo/Co (which exhibit a higher hydrodesulfurization activity) got increased the closer to the central point of the cross-section, and in this context, during the diffusion of a reactant molecule into the central point of the catalyst particle, it was firstly saturated by hydrogenation, and then reacted at the Mo/Co sites, which exhibit with a higher direct desulfuration activity, whereby bettering the deep desulfuration performances of the catalyst.

Example II-4

This example illustrates the activity evaluation experiment of a catalyst.

The catalyst activity evaluation experiment was performed on a 100 ml small-scale hydrogenation unit, and the catalyst was subject to a pre-sulfuration prior to the activity evaluation. The catalyst evaluation conditions included a total reaction pressure of 6.0 MPa, a liquid hourly space velocity of 2.0 $h^{-1}$, a hydrogen/oil ratio of 500:1, a reaction temperature of 340 degrees Celsius. The properties of the oil feedstock for the activity evaluation experiment were listed in Table II-7, and the activity evaluation results were listed in Table II-8 and II-9, which data revealed that, the hydrotreating catalyst, if produced in line with the present inventive process, exhibited a desulfuration activity significantly greater than that of a comparative example catalyst.

TABLE II-7

Properties of the oil feedstock

| oil feedstock | diesel oil fraction |
|---|---|
| density (20 degrees Celsius), g/cm³ | 0.8533 |
| distillation range, degrees Celsius | |
| IBP | 217 |
| EBP | 375 |
| S, wt % | 1.78 |
| N, µg/g | 140 |

TABLE II-8

The catalyst activity evaluation results

| catalyst | C1 | C2 | C3 | C4 | C5 | C6 | C7 | C8 |
|---|---|---|---|---|---|---|---|---|
| relative desulfuration activity, % | 133 | 138 | 132 | 139 | 135 | 132 | 134 | 100 |

TABLE II-9

The content of hardly desulfurizating compounds in the oil feedstock and that in the hydrogenation product

| | oil feedstock | C1 | C2 | C3 | C4 | C5 | C6 | C7 | C8 |
|---|---|---|---|---|---|---|---|---|---|
| 4,6-BMDBT, µg/g | 215 | 14.0 | 12.5 | 13.7 | 12.5 | 13.3 | 14.0 | 13.6 | 23.8 |

In the first line of Table II-9, the symbol C1 represented the hydrogenation product obtained by treating the oil feedstock in the presence of the catalyst C1 as the hydrotreating catalyst, and other symbols were to be understood in a similar way.

Example III

In the following examples, a cylindrical alumina carrier was used as the particulate porous refractory carrier, which was prepared by a method wherein 400 g pseudo boehmite dry powder was weighted, there were added 8 g citric acid and 8 g sesbania powder, after mixed till homogeneous, there was added 345 g of an acidic solution, which had a $HNO_3$ concentration by weight of 3.6%, kneaded for 20 min, rolled for 20 min, and then on an extruder extruded into a carrier of cylindrical shape, which was dried at 120 degrees Celsius for 4 h and then calcinated at 500 degrees Celsius for 4 h, to obtain the alumina carrier C of this invention, which had a diameter of about 1.2 mm, a length of about 3-5 mm, and exhibited physicochemical properties as illustrated in Table III-1.

TABLE III-1

The physicochemical properties of the alumina carrier C used in the Example and the Comparative Example

| items | alumina carrier C |
|---|---|
| the specific surface area, m²/g | 293 |
| the pore volume, mL/g | 0.61 |
| the bulk density, g/100 ml | 64 |
| the saturated liquid absorption, ml/100 g | 73 |

In this example, in the Mo—Co—P impregnating liquid, the Mo precursor was $MoO_3$, the Co precursor was basic cobalt carbonate, the P precursor was phosphoric acid; in the W—Ni impregnating liquid, the W precursor was ammonium metatungstate, the Ni precursor was nitrate nickel.

Example III-1

1.5 g citric acid was weighted, and dissolved under stirring in 15 g water, to obtain a wetting liquid. 100 g of the alumina carrier C was weighted, and the wetting liquid was evenly sprayed onto the alumina carrier C, with a spraying duration of 10 min, after the completion of the spraying of the wetting liquid, to obtain a sample. The same procedure as aforesaid was repeated to prepare three batches of sample. After the completion of the spraying of the wetting liquid, the first batch was directly at 100 degrees Celsius dried for 2 h, impregnated with 67.5 mL of the Mo—Co—P containing impregnating liquid by incipient wetness impregnation, and then dried at 120 degrees Celsius for 3 h, calcinated at 480 degrees Celsius for 2 h, to obtain a semi-product named as B1; After the completion of the spraying of the wetting liquid, the second batch was aged for 1 h, and subject to the same post-treatment as that for the catalyst B1, to obtain a semi-product named as B2; After the completion of the spraying of the wetting liquid, the third batch was aged for 5 h, and subject to the same post-treatment as that for the catalyst B1, to obtain a semi-product named as B3.

The B1, B2 and B3 were impregnated with 66 mL of the W—Ni containing impregnating liquid by incipient wetness impregnation respectively, and then dried at 120 degrees Celsius for 3 h, calcinated at 480 degrees Celsius for 2 h, to obtain a catalyst named respectively as C1, C2 and C3.

Example III-2

0.6 g oxalic acid was weighted and dissolved under stirring in 4 g ethanol, to obtain a wetting liquid. 100 g of the alumina carrier C was weighted, and the wetting liquid was evenly sprayed onto the alumina carrier C, with a spraying duration of 4 min. After the completion of the spraying of the wetting liquid, the obtained product was aged for 0.5 h. The carrier was impregnated with 68 mL of the Mo—Co—P containing impregnating liquid by incipient wetness impregnation, and then dried at 120 degrees Celsius for 3 h, calcinated at 480 degrees Celsius for 2 h, to obtain a semi-product named as B4.

The carrier was impregnated with 67 mL of the W—Ni containing impregnating liquid by incipient wetness impregnation, and then dried at 120 degrees Celsius for 3 h, calcinated at 480 degrees Celsius for 2 h, to obtain a catalyst named as C4.

Example III-3

5 g malonic acid was weighted, and dissolved under stirring in 20 g water, to obtain a wetting liquid. 100 g of the alumina carrier C was weighted, and the wetting liquid was evenly sprayed onto the alumina carrier C, with a spraying duration of 25 min. After the completion of the spraying of the wetting liquid, the obtained product was aged for 1 h, the carrier was impregnated with 51 mL of the Mo—Co—P containing impregnating liquid by incipient wetness impregnation, and then dried at 120 degrees Celsius for 3 h, calcinated at 480 degrees Celsius for 2 h, to obtain a semi-product named as B5.

The carrier was impregnated with 67 mL of the W—Ni containing impregnating liquid by incipient wetness impregnation, and then dried at 120 degrees Celsius for 3 h, calcinated at 480 degrees Celsius for 2 h, to obtain a catalyst named as C5.

Comparative Example III-1

100 g of the alumina carrier C was weighted, and impregnated with 73 mL of the Mo—Co—P containing impregnating liquid by incipient wetness impregnation, and then dried at 120 degrees Celsius for 3 h, calcinated at 480 degrees Celsius for 2 h, to obtain a semi-product named as B6. The B6 was impregnated with 67 mL of the W—Ni containing impregnating liquid by incipient wetness impregnation, and then dried at 120 degrees Celsius for 3 h, calcinated at 480 degrees Celsius for 2 h, to obtain a catalyst named as C6.

TABLE III-2

The composition of the example catalyst and the comparative example catalyst

| catalyst composition | catalyst No. | | | | | |
|---|---|---|---|---|---|---|
| | C1 | C2 | C3 | C4 | C5 | C6 |
| $WO_3$, wt % | 19.4 | 19.5 | 19.3 | 19.3 | 19.4 | 19.5 |
| $MoO_3$, wt % | 13.2 | 13.3 | 13.1 | 13.2 | 13.6 | 13.4 |
| CoO, wt % | 2.3 | 2.4 | 2.4 | 2.3 | 2.3 | 2.2 |
| NiO, wt % | 2.6 | 2.7 | 2.6 | 2.5 | 2.6 | 2.5 |
| $P_2O_5$, wt % | 1.45 | 1.48 | 1.47 | 1.47 | 1.45 | 1.48 |
| alumina | the remaining | the remaining | the remaining | the remaining | the remaining | the remaining |
| properties | | | | | | |
| the specific surface area, $m^2/g$ | 165 | 166 | 163 | 162 | 162 | 165 |
| the pore volume, mL/g | 0.33 | 0.32 | 0.33 | 0.34 | 0.33 | 0.33 |

TABLE III-3

The concentration distribution of Mo in the radial direction on the cross-section of the catalyst particle obtained from the Example and the Comparative Example

| | catalyst No. | | | | | |
|---|---|---|---|---|---|---|
| | C1 | C2 | C3 | C4 | C5 | C6 |
| $C^{Mo}_{out}$ | 0.12 | 0.29 | 0.54 | 0.37 | 0.29 | 0.99 |
| $C^{Mo}_{1/4}$ | 0.31 | 0.41 | 0.63 | 0.48 | 0.40 | 1.01 |
| $C^{Mo}_{1/2}$ | 0.65 | 0.78 | 0.84 | 0.87 | 0.79 | 0.98 |
| $C^{Mo}_{3/4}$ | 0.89 | 0.93 | 0.96 | 0.99 | 0.96 | 1.00 |

TABLE III-4

The concentration distribution of Co (the active metal component B) in the radial direction on the cross-section of the catalyst particle obtained from the Example and the Comparative Example

| | catalyst No. | | | | | |
|---|---|---|---|---|---|---|
| | C1 | C2 | C3 | C4 | C5 | C6 |
| $C^{B}_{out}$ | 0.14 | 0.27 | 0.51 | 0.32 | 0.24 | 0.98 |
| $C^{B}_{1/4}$ | 0.31 | 0.45 | 0.61 | 0.81 | 0.42 | 0.99 |
| $C^{B}_{1/2}$ | 0.65 | 0.79 | 0.86 | 0.96 | 0.71 | 1.02 |
| $C^{B}_{3/4}$ | 0.92 | 0.94 | 0.98 | 0.99 | 0.90 | 1.01 |

TABLE III-5

The concentration distribution of W in the radial direction on the cross-section of the catalyst particle obtained from the Example and the Comparative Example

| | catalyst No. | | | | | |
|---|---|---|---|---|---|---|
| | C1 | C2 | C3 | C4 | C5 | C6 |
| $C^W_{out}$ | 1.01 | 1.0 | 0.98 | 1.01 | 0.99 | 1.01 |
| $C^W_{1/4}$ | 1.0 | 1.02 | 1.01 | 0.99 | 0.98 | 1.0 |
| $C^W_{1/2}$ | 0.98 | 0.99 | 0.99 | 0.98 | 1.0 | 1.01 |
| $C^W_{3/4}$ | 1.02 | 1.01 | 1.0 | 1.01 | 1.01 | 1.01 |

TABLE III-6

The concentration distribution of Ni (the active metal component A) in the radial direction on the cross-section of the catalyst particle obtained from the Example and the Comparative Example

| | catalyst No. | | | | | |
|---|---|---|---|---|---|---|
| | C1 | C2 | C3 | C4 | C5 | C6 |
| $C^A_{out}$ | 1.01 | 0.99 | 1.02 | 0.98 | 1.0 | 0.99 |
| $C^A_{1/4}$ | 1.02 | 1.02 | 0.99 | 1.0 | 1.02 | 0.98 |
| $C^A_{1/2}$ | 1.0 | 1.01 | 1.01 | 0.99 | 0.99 | 1.0 |
| $C^A_{3/4}$ | 0.99 | 0.99 | 1.0 | 0.98 | 1.01 | 1.01 |

As can be seen from Table III-2, Table III-3 and Table III-4, according to the present inventive catalysts C1 to C5, the concentration of each active metal component Mo and Co gradually increased in the radial direction from the outmost edge to the central point on the cross-section of the catalyst particle, while according to the comparative catalyst C6, the concentration of each active metal component Mo and Co remained substantially the same at any position in the radial direction, not like the catalyst of this invention, which obviously took on a gradient distribution. The C1, C2 and C3 revealed that by adjusting the aging duration after the completion of the spraying with the wetting liquid, it was possible to adjust the concentration distribution of the active metal component in the radial direction on the cross-section of the catalyst particle; As can be seen from the C2, C4 and C5, by changing the volume of the wetting liquid, it was further possible to adjust the concentration distribution of the active metal components Mo and Co in the radial direction on the cross-section of the catalyst particle. In view of this, according to the catalyst obtained with the present inventive process, as compared with the comparative catalyst, it was easier to adjust the concentration distribution of an active metal component in the radial direction on the cross-section of the catalyst particle, such that the concentration of Mo/Co (which exhibit a higher hydrodesulfurization activity) got increased the closer to the central point of the cross-section, and in this context, during the diffusion of a reactant molecule into the central point of the catalyst particle, it was firstly saturated by hydrogenation, and then reacted at the Mo/Co sites, which exhibit with a higher direct desulfuration activity, whereby bettering the deep desulfuration performances of the catalyst.

Example III-4

This example illustrates the activity evaluation experiment of a catalyst.

The catalyst activity evaluation experiment was performed on a 100 ml small-scale hydrogenation unit, and the catalyst was subject to pre-sulfuration prior to the activity evaluation. The catalyst evaluation conditions included a total reaction pressure of 6.0 MPa, a liquid hourly space velocity of 2.0 $h^{-1}$, a hydrogen/oil ratio of 500:1, a reaction temperature of 340 degrees Celsius. The properties of the oil feedstock for the activity evaluation experiment were listed in Table III-7, and the activity evaluation results were listed in Table III-8 and III-9, which data revealed that, the hydrotreating catalyst, if produced in line with the present inventive process, exhibited a desulfuration activity significantly greater than that of a comparative example catalyst.

TABLE III-7

| Properties of the oil feedstock | |
|---|---|
| oil feedstock | diesel oil fraction |
| density (20 degrees Celsius), g/cm$^3$ | 0.8533 |
| distillation range, degrees Celsius | |
| IBP | 217 |
| EBP | 375 |
| S, wt % | 1.78 |
| N, µg/g | 140 |

TABLE III-8

The catalyst activity evaluation results

| | catalyst | | | | | |
|---|---|---|---|---|---|---|
| | C1 | C2 | C3 | C4 | C5 | C6 |
| relative desulfuration activity, % | 128 | 135 | 130 | 125 | 137 | 100 |

TABLE III-9

The content of hardly desulfurizating compounds in the oil feedstock and that in the hydrogenation product

| | oil feedstock | C1 | C2 | C3 | C4 | C5 | C6 |
|---|---|---|---|---|---|---|---|
| 4,6-BMDBT, µg/g | 215 | 17.3 | 16.2 | 16.9 | 17.6 | 15.7 | 25.5 |

In the first line of Table III-9, the symbol C1 represented a hydrogenation product obtained by treating the oil feedstock in the presence of the catalyst C1 as a hydrotreating catalyst, and other symbols were to be understood in a similar way.

Example IV

The alumina carrier to be used in this example was the same as that in Example I, that is, the alumina carrier A.

In the Mo—Ni—P impregnating liquid and the Mo—Co—P impregnating liquid of this example, the Mo precursor was $MoO_3$, the Ni precursor was basic nickel carbonate, the Co precursor was basic cobalt carbonate, the P precursor was phosphoric acid.

Example IV-1

16.5 g polyethylene glycol 2000 (i.e. polyethylene glycol having a molecular weight of 2000 hereinafter) was weighted and dissolved under stirring in a predetermined amount of water, to obtain 225 mL of a solution I. 300 g of the alumina carrier A was impregnated with the solution I, and then aged for 10 h, dried at 120 degrees Celsius for 3 h, to obtain a sample named as B1.

The B1 sample was spray impregnated with 204 mL of the Mo—Ni—P containing impregnating liquid by incipient wetness impregnation, after the completion of the spray impregnation, not aged and directly at 120 degrees Celsius dried for 3 h, calcinated at 480 degrees Celsius for 2 h, to obtain a sample named as Z1.

18 g tartaric acid was weighted, and dissolved under stirring in 45 g water, to obtain a wetting liquid II. The wetting liquid II was evenly spray impregnated onto the Z1, with a spray impregnation duration of 15 min. After the completion of the spray impregnation with the wetting liquid II, the obtained product was dried at 100 degrees Celsius for 2 h, impregnated with 183 mL of the Mo—Co—P containing impregnating liquid by incipient wetness impregnation, and then the impregnated sample was divided into three batches, wherein the first batch was not aged, but dried at 120 degrees Celsius for 3 h, calcinated at 480 degrees Celsius for 2 h, to obtain a sample named as C1; the second batch was aged for 1 h, and then was dried at 120 degrees Celsius for 3 h, calcinated at 480 degrees Celsius for 2 h, to obtain a sample named as C2; the third batch was aged for 3 h, and then dried at 120 degrees Celsius for 3 h, calcinated at 480 degrees Celsius for 2 h, to obtain a sample named as C3.

Example IV-2

21 g polyethylene glycol 1000 was weighted, and dissolved under stirring in a predetermined amount of water, to obtain 225 mL of a solution I. 300 g of the alumina carrier A was impregnated with the solution I by incipient wetness impregnation, and then aged for 5 h, dried at 120 degrees Celsius for 3 h, to obtain a sample named as B4.

The B4 sample was spray impregnated with 204 mL of the Mo—Ni—P containing impregnating liquid by incipient wetness impregnation, and after the completion of the spray impregnation, the obtained sample was evenly divided into three batches. The first batch was directly at 120 degrees Celsius dried for 3 h, calcinated at 480 degrees Celsius for 2 h, to obtain a sample named as Z4; the second batch was aged for 1 h, dried at 120 degrees Celsius for 3 h, calcinated at 480 degrees Celsius for 2 h, to obtain a sample named as Z5; the third batch was aged for 3 h, dried at 120 degrees Celsius for 3 h, calcinated at 480 degrees Celsius for 2 h, to obtain a sample named as Z6.

1.5 g malic acid was weighted, and dissolved under stirring in 6 g ethanol, to obtain a wetting liquid II. The wetting liquid II was evenly spray impregnated onto the Z4, with a spray impregnation duration of 5 min. The sample was impregnated with 54 mL of the Mo—Co—P containing impregnating liquid by incipient wetness impregnation, and after the completion of the impregnation, aged for 1 h, and then dried at 120 degrees Celsius for 3 h, calcinated at 480 degrees Celsius for 2 h, to obtain a catalyst named as C4. The Z5 and Z6 samples were treated with the same steps as those for the Z4, to obtain a catalyst respectively named as C5 and C6.

Example IV-3

3 g polyethylene glycol 8000 was weighted, and dissolved under stirring in a predetermined amount of water, to obtain 75 mL of a solution I. 100 g of the alumina carrier A was impregnated with the solution I by incipient wetness impregnation, and then aged for 5 h, dried at 120 degrees Celsius for 3 h, to obtain a sample named as B7.

The B7 sample was spray impregnated with 69 mL of the Mo—Ni—P containing impregnating liquid by incipient wetness impregnation, and then directly dried at 120 degrees Celsius for 3 h, calcinated at 480 degrees Celsius for 2 h, to obtain a sample named as Z7.

3 g citric acid and 3 g malonic acid were weighted, and dissolved under stirring in 20 g water, to obtain a wetting liquid II. 100 g of the Z7 sample was weighted, and the wetting liquid II was evenly spray impregnated onto the Z7, with a spray impregnation duration of 25 min, and after the completion of the spray impregnation with the wetting liquid II, dried at 100 degrees Celsius for 2 h, the sample was impregnated with 55 mL of the Mo—Co—P containing impregnating liquid by incipient wetness impregnation, and after the completion of the impregnation, aged for 1 h, and then dried at 120 degrees Celsius for 3 h, calcinated at 480 degrees Celsius for 2 h, to obtain a catalyst named as C7.

Comparative Example IV-1

100 g of the alumina carrier A was weighted, and the carrier was impregnated with 75 mL of the Mo—Ni—P containing impregnating liquid by incipient wetness impregnation, and then dried at 120 degrees Celsius for 3 h, calcinated at 480 degrees Celsius for 2 h, to obtain a sample named as B8. The B8 was impregnated with 70 mL of the Mo—Co—P containing impregnating liquid by incipient wetness impregnation, and then dried at 120 degrees Celsius for 3 h, calcinated at 480 degrees Celsius for 2 h, to obtain a catalyst named as C8.

TABLE IV-1

The composition of the example catalyst and the comparative example catalyst

| composition | catalyst No. | | | | | | | |
| --- | --- | --- | --- | --- | --- | --- | --- | --- |
| | C1 | C2 | C3 | C4 | C5 | C6 | C7 | C8 |
| $MoO_3$, wt % | 20.4 | 20.3 | 20.1 | 20.0 | 20.2 | 20.2 | 20.1 | 20.4 |
| CoO, wt % | 2.0 | 2.0 | 2.1 | 2.2 | 2.0 | 2.1 | 2.2 | 2.1 |
| NiO, wt % | 2.2 | 2.3 | 2.3 | 2.2 | 2.4 | 2.3 | 2.2 | 2.3 |
| $P_2O_5$, wt % | 2.2 | 2.3 | 2.3 | 2.2 | 2.2 | 2.3 | 2.2 | 2.3 |
| $Al_2O_3$, wt % | the remaining | the remaining | the remaining | the remaining | the remaining | the remaining | the remaining | the remaining |
| the ratio by molar of Mo in the first Mo containing impregnating liquid to that | 1.0 | 1.0 | 1.0 | 0.8 | 0.8 | 0.8 | 1.2 | 1.0 |

TABLE IV-1-continued

The composition of the example catalyst and the comparative example catalyst

| composition | catalyst No. | | | | | | | |
|---|---|---|---|---|---|---|---|---|
| | C1 | C2 | C3 | C4 | C5 | C6 | C7 | C8 |
| in the second Mo containing impregnating liquid properties | | | | | | | | |
| the specific surface area, m²/g | 181 | 180 | 179 | 184 | 183 | 182 | 179 | 182 |
| the pore volume, mL/g | 0.38 | 0.38 | 0.37 | 0.37 | 0.37 | 0.37 | 0.37 | 0.38 |

TABLE IV-2

The concentration distribution of Co (the active metal component B) in the radial direction on the cross-section of the catalyst particle obtained from the Example and the Comparative Example

| | catalyst No. | | | | | | | |
|---|---|---|---|---|---|---|---|---|
| | C1 | C2 | C3 | C4 | C5 | C6 | C7 | C8 |
| $C^B_{out}$ | 0.15 | 0.29 | 0.52 | 0.32 | 0.35 | 0.34 | 0.31 | 0.99 |
| $C^B_{1/4}$ | 0.31 | 0.48 | 0.62 | 0.79 | 0.78 | 0.80 | 0.45 | 0.98 |
| $C^B_{1/2}$ | 0.63 | 0.82 | 0.90 | 0.95 | 0.96 | 0.96 | 0.81 | 1.00 |
| $C^B_{3/4}$ | 0.91 | 0.94 | 0.98 | 0.99 | 0.98 | 1.00 | 0.95 | 0.99 |

TABLE IV-3

The concentration distribution of Ni (the active metal component A) in the radial direction on the cross-section of the catalyst particle obtained from the Example and the Comparative Example

| | catalyst No. | | | | | | | |
|---|---|---|---|---|---|---|---|---|
| | C1 | C2 | C3 | C4 | C5 | C6 | C7 | C8 |
| $C^A_{out}$ | 2.77 | 2.80 | 2.81 | 2.93 | 2.53 | 2.08 | 2.56 | 0.99 |
| $C^A_{1/4}$ | 1.89 | 1.86 | 1.89 | 1.96 | 1.71 | 1.54 | 1.73 | 1.00 |
| $C^A_{1/2}$ | 1.27 | 1.24 | 1.24 | 1.33 | 1.24 | 1.16 | 1.20 | 1.01 |
| $C^A_{3/4}$ | 1.08 | 1.09 | 1.10 | 1.13 | 1.08 | 1.06 | 1.06 | 0.98 |

TABLE IV-4

The concentration distribution of Ni/Mo in the radial direction on the cross-section of the catalyst particle obtained from the Example and the Comparative Example

| | catalyst No. | | | | | | | |
|---|---|---|---|---|---|---|---|---|
| | C1 | C2 | C3 | C4 | C5 | C6 | C7 | C8 |
| Ni/Mo (the outmost surface) | 0.42 | 0.40 | 0.41 | 0.42 | 0.39 | 0.37 | 0.40 | 0.20 |
| Ni/Mo (¼ position point) | 0.29 | 0.27 | 0.28 | 0.30 | 0.28 | 0.27 | 0.27 | 0.21 |
| Ni/Mo (½ position point) | 0.21 | 0.22 | 0.21 | 0.22 | 0.20 | 0.20 | 0.21 | 0.20 |
| Ni/Mo (¾ position point) | 0.17 | 0.18 | 0.18 | 0.18 | 0.16 | 0.16 | 0.17 | 0.22 |
| Ni/Mo (the central point) | 0.15 | 0.16 | 0.16 | 0.15 | 0.14 | 0.14 | 0.15 | 0.22 |

TABLE IV-5

The concentration distribution of Co/Mo in the radial direction on the cross-section of the catalyst particle obtained from the Example and the Comparative Example

| | catalyst No. | | | | | | | |
|---|---|---|---|---|---|---|---|---|
| | C1 | C2 | C3 | C4 | C5 | C6 | C7 | C8 |
| Co/Mo (the outmost surface) | 0.06 | 0.09 | 0.13 | 0.08 | 0.07 | 0.08 | 0.08 | 0.22 |
| Co/Mo (¼ position point) | 0.14 | 0.17 | 0.18 | 0.18 | 0.19 | 0.20 | 0.13 | 0.23 |
| Co/Mo (½ position point) | 0.31 | 0.29 | 0.25 | 0.31 | 0.32 | 0.32 | 0.26 | 0.22 |
| Co/Mo (¾ position point) | 0.38 | 0.36 | 0.31 | 0.33 | 0.35 | 0.34 | 0.32 | 0.23 |
| Co/Mo (the central point) | 0.43 | 0.39 | 0.33 | 0.35 | 0.37 | 0.36 | 0.38 | 0.22 |

As can be seen from Table IV-2 and Table IV-3, according to the present inventive catalysts C1 to C7, the concentration of the active metal Co in the catalyst particle gradually increased in the radial direction from the edge to the center, and the concentration of the active metal Ni in the catalyst particle gradually decreased in the radial direction from the edge to the center, while according to the comparative catalyst C8, the concentration of each active metal Co, Ni remained substantially the same at any position in the radial direction, not like the catalyst of this invention, which obviously took on a gradient distribution. The C1, C2 and C3 revealed that by adjusting the aging duration after the spray impregnation with the wetting liquid II, it was possible to adjust the concentration distribution of the active metal Co in the radial direction in the catalyst particle; As can be seen from the C2, C6 and C7, by changing the content of the wetting liquid II, it was further possible to adjust the concentration distribution of the active metal Co in the radial direction in the catalyst particle; As can be seen from the C4, C5, C6 and C7, by changing the content of the wetting liquid I and the aging duration after the spray impregnation with Mo—Ni—P, it was possible to adjust the concentration distribution of the active metal Ni in the radial direction in the catalyst particle. In view of this, it was easier for the present inventive process to adjust the concentration distribution of an active metal component in the radial direction of the catalyst particle, such that the concentration of Mo/Ni (which exhibit better aromatics saturation performances) got increased the closer to the edge of the cross-section, while the concentration of Mo/Co (which exhibit a higher hydrodesulfurization activity) got increased the closer to the central point of the cross-section, and in this context, during the diffusion of a reactant molecule into the central point of the catalyst particle, it was firstly saturated by hydrogenation, and then reacted at the Mo/Co sites, which exhibit with a higher direct desulfuration activity, whereby bettering the deep desulfuration performances of the catalyst.

Example IV-4

This example illustrates the activity evaluation experiment of a catalyst.

The catalyst activity evaluation experiment was performed on a 100 ml small-scale hydrogenation unit, and the catalyst was subject to pre-sulfuration prior to the activity evaluation. The catalyst evaluation conditions included a total reaction pressure of 6.0 MPa, a liquid hourly space velocity of 2.0 h$^{-1}$, a hydrogen/oil ratio of 500:1, a reaction temperature of 340 degrees Celsius. The properties of the oil feedstock for the activity evaluation experiment were listed in Table IV-6, and the activity evaluation results were listed in Table IV-7 and IV-8, which data revealed that, the hydrotreating catalyst, if produced in line with the present inventive process, exhibited a desulfuration activity significantly greater than that of a comparative example catalyst.

TABLE IV-6

Properties of the oil feedstock

| oil feedstock | diesel oil fraction |
|---|---|
| density (20 degrees Celsius), g/cm$^3$ | 0.8533 |
| distillation range, degrees Celsius | |
| IBP | 217 |
| EBP | 375 |
| S, wt % | 1.78 |
| N, μg/g | 140 |

TABLE IV-7

The catalyst activity evaluation results

| | catalyst | | | | | | | |
|---|---|---|---|---|---|---|---|---|
| | C1 | C2 | C3 | C4 | C5 | C6 | C7 | C8 |
| relative desulfuration activity, % | 132 | 139 | 133 | 139 | 136 | 133 | 132 | 100 |

TABLE IV-8

The content of hardly desulfurizating compounds in the oil feedstock and that in the hydrogenation product

| | oil feedstock | C1 | C2 | C3 | C4 | C5 | C6 | C7 | C8 |
|---|---|---|---|---|---|---|---|---|---|
| 4,6-BMDBT, μg/g | 215 | 14.1 | 12.6 | 14.0 | 12.8 | 13.4 | 14.1 | 14.3 | 24.6 |

In the first line of Table IV-8, the symbol C1 represented a hydrogenation product obtained by treating the oil feedstock in the presence of the catalyst C1 as the hydrotreating catalyst, and other symbols were to be understood in a similar way.

The invention claimed is:

1. A hydrotreating catalyst comprising:
a porous refractory carrier;
one or more compounds selected from the group consisting oxides of elements in Group II, Group III, and Group IV in the periodic table;
an active metal component A, an active metal component B, and an active metal component C; and
optionally an auxiliary component,
wherein the active metal component A is Ni, the active metal component B is one or more metals selected from the group consisting of Group VIII metals other than Ni, the active metal component C is one or more metals selected from the group consisting of Group VIB metals, the auxiliary component is one or more selected from the group consisting of fluorine, silicon, phosphorus, titanium, zirconium, and boron,
wherein the hydrotreating catalyst is in a form of catalyst particles,
wherein $C^M_{out}$ presents a ratio of an amount of an active metal component M at an arbitrary point $P_A$ on an outmost edge of a cross-section of the catalyst particle to an amount the active metal component M at a central point $P_o$ on the cross-section of the catalyst particle, and
when a length of a line segment connecting $P_o$ and $P_A$ on the cross-section of the catalyst particle is $L_A$,
$C^M_{1/2}$ represents a ratio of the amount of M at a point on the line segment (½)$L_A$ away from $P_A$ to the amount of M at $P_o$,
$C^M_{1/4}$ presents a ratio of the amount of M at a point on the line segment (¼)$L_A$ away from $P_A$ to the amount of M at $P_o$,
$C^M_{3/4}$ presents a ratio of the amount of M at a point on the line segment (¾)$L_A$ away from $P_A$ to the amount of M at $P_o$,
$C^M_{opt}$, $C^M_{opt\text{-}1}$, $C^M_{opt\text{-}2}$ respectively represent ratios of the amount of M at arbitrary points $P_{opt}$, $P_{opt\text{-}1}$, and $P_{opt\text{-}2}$ (excluding $P_a$ or $P_o$) on the line segment to the amount of M at $P_o$,
wherein M stands for the active metal component A, the active metal component B, or the active metal component C,
wherein a distribution of the active metal component A satisfies Conditions (I) or (II),
Condition (I): the active metal component A is substantially uniformly distributed throughout the catalyst particle,
Condition (II): the distribution of the active metal component A simultaneously satisfies Formulas (1) and (2):

$$C^A_{out} > C^A_{1/4} > C^A_{1/2} > C^A_{3/4} > 1, \qquad \text{Formula (1):}$$

$$C^A_{out} \geq 1.5, \qquad \text{Formula (2):}$$

wherein a distribution of the active metal component B satisfies Conditions (III) or (IV),
Condition (III): the active metal component B is substantially uniformly distributed throughout the catalyst particle, Condition (IV): the distribution of the active metal component B simultaneously satisfies Formulas (3) and (4):

$$C^B_{out} < C^B_{1/4} < C^B_{1/2} < C^B_{3/4} < 1, \quad \text{Formula 3):}$$

$$C^B_{out} \leq 0.80, \quad \text{Formula (4):}$$

with the proviso that Conditions (I) and (III) are not simultaneously satisfied.

2. The hydrotreating catalyst according to claim 1, having a specific surface area (by the BET method) of 100-260 m²/g, and a pore volume (by the BET method) of 0.20-0.60 ml/g.

3. The hydrotreating catalyst according to claim 1, based on a total weight of the catalyst, wherein a weight percentage of the porous refractory carrier is 45-89 wt %; a weight percentage of the active metal component A (as NiO) is 1-8 wt %; a weight percentage of the active metal component B (as the corresponding oxide) is at least 0.5 wt %, at most 8 wt %; a weight percentage of the active metal component C (as the corresponding oxide) is 6-60 wt % and a weight percentage of the auxiliary component (as the corresponding element) is 30 wt % or less.

4. The hydrotreating catalyst according to claim 1, wherein the active metal component C is Mo, and the distribution of Mo meets Conditions (V) or (VI), Condition (V): Mo is substantially uniformly distributed throughout the catalyst particle, Condition (VI): the distribution of Mo simultaneously satisfies Formulas (5) and (6):

$$C^{Mo}_{out} < C^{Mo}_{1/4} < C^{Mo}_{1/2} < C^{Mo}_{3/4} < 1, \quad \text{Formula (5):}$$

$$0.08 \leq C^{Mo}_{out} \leq 0.70, \quad \text{Formula (6):}$$

or, the active metal component C is a combination of Mo and W, the distribution of Mo meets Conditions (V) or (VI), while the distribution of W meets Conditions (VII) or (VIII), Condition (V): Mo is substantially uniformly distributed throughout the catalyst particle, Condition (VI): the distribution of Mo simultaneously satisfies Formulas (5) and (6):

$$C^{Mo}_{out} < C^{Mo}_{1/4} < C^{Mo}_{1/2} < C^{Mo}_{3/4} < 1, \quad \text{Formula (5):}$$

$$0.08 \leq C^{Mo}_{out} \leq 0.70, \quad \text{Formula (6):}$$

Condition (VII): W is substantially uniformly distributed throughout the catalyst particle, Condition (VIII): the distribution of Mo simultaneously satisfies Formulas (5) and (6):

$$C^W_{out} > C^W_{1/4} > C^W_{1/2} > C^W_{3/4} > 1, \quad \text{Formula (7):}$$

$$7.0 \geq C^W_{out} \geq 1.2. \quad \text{Formula (8):}$$

5. The hydrotreating catalyst according to claim 1, wherein in Formula (5): $C^{Mo}_{out} < C^{Mo}_{opt} < 1$; and in Formula (7): $C^W_{out} > C^W_{opt} > 1$.

6. The hydrotreating catalyst according to claim 1, wherein on the outmost surface of the catalyst particle, the ratio of the amount of the active metal component A to the amount of the active metal component C is 0.22-0.80, and/or, at $P_o$, the ratio of the amount of the active metal component B to the amount of the active metal component C is 0.20-0.78.

7. The hydrotreating catalyst according to claim 6, wherein the value of $(d2_A - d1_A)/L_A$ is 0.5% or less.

8. The hydrotreating catalyst according to claim 6, wherein $C^A_{opt-1} > 98\% \, C^A_{opt-2}$ is true.

9. The hydrotreating catalyst according to claim 6, wherein the Formula (1) is $C^A_{out} > C^A_{opt-1} > C^A_{opt-2} > 1$.

10. The hydrotreating catalyst according to claim 6, wherein the value of $(d2_B - d1_B)/L_B$ is 0.5% or less.

11. The hydrotreating catalyst according to claim 6, wherein $C^B_{opt-1} < 102\% \, C^B_{opt-2}$ is true.

12. The hydrotreating catalyst according to claim 6, wherein the Formula (3) is $C^B_{out} < C^B_{opt-1} < C^B_{opt-2} < 1$.

13. The hydrotreating catalyst according to claim 1, wherein, when the active metal component A is distributed according to Formula (1), the amount of the active metal component A along the line segment from $P_A$ to $P_o$ substantially gradually decreases, with the proviso that $(d2_A - d1_A)/L_A$ is 5% or less, $C^A_{opt-1} > 90\% \, C^A_{opt-2}$ is true, and wherein $d1_A$ is the linear distance between $P_A$ and $P_{opt-1}$, $d2_A$ is the linear distance between $P_A$ and $P_{opt-2}$, and $d1_A/d2_A < 1$, or, when the active metal component B is distributed according to Formula (3), the amount of the active metal component B along the line segment from a point $P_B$ to $P_o$ substantially gradually increases, with the proviso that when $(d2_B - d1_B)/L_B$ is 5% or less, $C^B_{opt-1} < 110\% \, C^B_{opt-2}$ is true, wherein $d1_B$ is the linear distance between $P_B$ and $P_{opt-1}$, $d2_B$ is the linear distance between $P_B$ and $P_{opt-2}$, and $d1_B/d2_B < 1$.

14. A method of using a hydrotreating catalyst, comprising:

providing the hydrotreating catalyst according to claim 1;

contacting a heavy distillate oil with the hydrotreating catalyst to remove at least a portion of sulfur in the heavy distillate oil.

15. A process for hydrodesulfurizating heavy distillate oil, comprising a step of contacting a heavy distillate oil feedstock with the hydrotreating catalyst according to claim 1 under hydrodesulfurization conditions.

16. The hydrotreating catalyst according to claim 1, wherein the carrier is one or more selected from the group consisting of silica, alumina, magnesia, silica-alumina, silica-magnesia and alumina-magnesia.

17. The hydrotreating catalyst according to claim 16, wherein the weight percentage of phosphorus (as $P_2O_5$) is 1-6 wt % based on the total weight of the catalyst.

18. The hydrotreating catalyst according to claim 1, wherein the active metal component B is Co.

19. The hydrotreating catalyst according to claim 1, wherein the active metal component C is one or more selected from the group consisting of Mo and W.

20. The hydrotreating catalyst according to claim 19, wherein the weight percentage of Mo (as $MoO_3$) is 6-40 wt %, and/or, the weight percentage of W (as $WO_3$) is 6-28 wt %.

21. The hydrotreating catalyst according to claim 1, wherein the auxiliary component is phosphorus.

22. The hydrotreating catalyst according to claim 1, wherein in Formula (1): $C^A_{out} > C^A_{opt} > 1$.

23. The hydrotreating catalyst according to claim 1, wherein in Formula (1): $C^A_{out}/C^A_{1/2} = 1.5\text{-}2.6$, $C^A_{out}/C^A_{1/4} = 1.2\text{-}1.8$, $C^A_{1/4}/C^A_{1/2} = 1.1\text{-}1.7$, and in Formula (2): $C^A_{out} \geq 2.0$, but $C^A_{out} \leq 4.0$; and in Formula (3): $C^B_{out}/C^B_{1/2} = 0.2\text{-}0.8$, $C^B_{out}/C^B_{1/4} = 0.3\text{-}0.9$, $C^B_{1/4}/C^B_{1/2} = 0.4\text{-}0.9$, and in Formula (4): $C^B_{out} \leq 0.68$, but $C^B_{out} \geq 0.20$.

24. The hydrotreating catalyst according to claim 1, wherein the distribution of the active metal component A satisfies Condition (II), and at the same time, the distribution of the active metal component B meets the condition (IV).

25. The hydrotreating catalyst according to claim 1, wherein the weight percentage of the active metal component B is 1-6 wt %.

26. A process for producing a hydrotreating catalyst, comprising at least the following steps:
  (1-1) By unsaturated impregnation, onto a particulate porous refractory carrier one or more compounds selected from the group consisting of oxides of a Group II, Group III or Group IV element in the element periodic table, an adsorbent I, and optionally an organic alcohol having a carbon atom number of 1-5, wherein the adsorbent I is one or more selected from the group consisting of an organic carboxylic acid having a carbon atom number of 2-15 and an ammonium salt thereof, wherein an amount of the adsorbent I is 0.1-10 wt % relative to the amount of the porous refractory carrier, an amount of the organic alcohol is 0.1-10 wt % relative to the amount of the porous refractory carrier,
  (1-2) supporting on a product obtained from the step (1-1) an active metal component B, optionally an active metal component C and optionally an auxiliary component, wherein the active metal component B is one or more selected from the group consisting of Group VIII metals other than Ni in the element periodic table, the active metal component C is one or more selected from the group consisting of Group VIB metals in the element periodic table, the auxiliary component is one or more selected from the group consisting of fluorine, silicon, phosphorus, titanium, zirconium and boron, and
  (1-3) prior to the step (1-1) and/or after the step (1-2), supporting onto the porous refractory carrier, an active metal component A, optionally the active metal component C and optionally the auxiliary component, wherein the active metal component A is Ni,
  with the proviso that the active metal component C is supported through at least one out of the step (1-2) and the step (1-3),
  or,
  comprising at least the following steps:
  (2-1) By saturated impregnation or oversaturated impregnation, onto a particulate porous refractory carrier one or more selected from the group consisting of oxides of a Group II, Group III or Group IV element in the element periodic table, an adsorbent II, wherein the adsorbent II is a polyol having a number averaged molecular weight Mn (by the GPC method) of 400-10000, wherein an amount of the adsorbent II is 0.1-10 wt % relative to the amount of the porous refractory carrier;
  (2-2) supporting onto the product obtained from the step (2-1), an active metal component A, optionally an active metal component C and optionally an auxiliary component, wherein the active metal component A is Ni, the active metal component C is one or more selected from the group consisting of Group VIB metals in the element periodic table, the auxiliary component is one or more selected from the group consisting of fluorine, silicon, phosphorus, titanium, zirconium and boron, and
  (2-3) prior to the step (2-1) and/or after the step (2-2), supporting onto the porous refractory carrier an active metal component B, optionally the active metal component C and optionally the auxiliary component, wherein the active metal component B is one or more selected from the group consisting of Group VIII metals other than Ni in the element periodic table,
  with the proviso that the active metal component C is supported through at least one of the step (2-2) and the step (2-3),
  or,
  comprising at least the following steps:
  (3-1) By unsaturated impregnation, onto a particulate porous refractory carrier one or more selected from the group consisting of oxides of a Group II, Group III or Group IV element in the element periodic table, an adsorbent I, and optionally an organic alcohol having a carbon atom number of 1-5, wherein the adsorbent I is one or more selected from the group consisting of organic carboxylic acids having a carbon atom number of 2-15 and ammonium salts thereof, wherein an amount of the adsorbent I is 0.1-10 wt % relative to the amount of the porous refractory carrier, the organic alcohol is 0.1-10 wt % relative to the amount of the porous refractory carrier,
  (3-2) supporting onto the product obtained from the step (3-1), an active metal component B, optionally an active metal component C and optionally an auxiliary component are supported, wherein the active metal component B is one or more selected from the group consisting of Group VIII metals other than Ni in the element periodic table, the active metal component C is one or more selected from the group consisting of Group VIB metals in the element periodic table, the auxiliary component is one or more selected from the group consisting of fluorine, silicon, phosphorus, titanium, zirconium and boron,
  (3-3) impregnating saturately or oversaturately onto a product obtained from the step (3-2) an adsorbent II, wherein the adsorbent II is a polyol having a number averaged molecular weight Mn (by the GPC method) of 400-10000, wherein an amount of the adsorbent II is 0.1-10 wt % relative to the amount of the porous refractory carrier;
  (3-4) supporting onto the product obtained from the step (3-3) an active metal component A, optionally the active metal component C and optionally the auxiliary component are supported, wherein the active metal component A is Ni, and
  (3-5) optionally, prior to the step (3-1), or between the step (3-2) and the step (3-3), or after the step (3-4), onto the porous refractory carrier, the active metal component C and optionally the auxiliary component are supported,
  with the proviso that the active metal component C is supported through at least one out of the step (3-2), the step (3-4) and the step (3-5)
  or,
  comprising at least the following steps:
  (4-1) by saturated impregnation or oversaturated impregnation, onto a particulate porous refractory carrier one or more selected from the group consisting of oxides of a Group II, Group III or Group IV element in the element periodic table, an adsorbent II, wherein the adsorbent II is a polyol having a number averaged molecular weight Mn (by the GPC method) of 400-10000, wherein an amount of the adsorbent II is of 0.1-10 wt % relative to the amount of the porous refractory carrier;

(4-2) supporting on the product obtained from the step (4-1), an active metal component A, optionally an active metal component C and optionally an auxiliary component are supported, wherein the active metal component A is Ni, the active metal component C is one or more selected from the group consisting of Group VIB metals in the element periodic table, the auxiliary component is one or more selected from the group consisting of fluorine, silicon, phosphorus, titanium, zirconium and boron, (4-3) By unsaturated impregnation, onto the product obtained from the step (4-2), supporting an adsorbent I, and optionally an organic alcohol having a carbon atom number of 1-5, wherein the adsorbent I is one or more selected from the group consisting of organic carboxylic acids having a carbon atom number of 2-15 and ammonium salts thereof, an amount of the adsorbent I is 0.1-10 wt % relative to the amount of the porous refractory carrier, an amount of the organic alcohol is of 0.1-10 wt % relative to the amount of the porous refractory carrier, (4-4) supporting on the product obtained from the step (4-3), an active metal component B, optionally the active metal component C and optionally the auxiliary component are supported, wherein the active metal component B is one or more selected from the group consisting of Group VIII metals other than Ni in the element periodic table, and (4-5) Optionally, prior to the step (4-1), between the step (4-2) and the step (4-3) and/or the step (4-4), supporting onto the porous refractory carrier, the active metal component C and optionally the auxiliary component are supported, with the proviso that the active metal component C is supported through at least one out of the step (4-2), the step (4-4) and the step (4-5).

27. The process according to claim 26, further comprising at least one out of the following steps:

(I) After the completion of the step (1-1) while before the beginning of the step (1-2), the obtained product is optionally aged for 0.5-8 h, and/or dried at a temperature of 60-250 degrees Celsius for 0.5-20 h;

(II) After the completion of the step (1-2) while before the beginning of the step (1-3), the obtained product is optionally aged for 0.5-6 h, and dried at a temperature of 70-200 degrees Celsius for 0.5-20 h and calcinated at a temperature of 300-750 degrees Celsius for 0.5-20 h;

(III) After the completion of the step (1-3), the obtained product is optionally aged for 0.5-6 h, dried at a temperature of 70-200 degrees Celsius for 0.5-20 h and calcinated at a temperature of 300-750 degrees Celsius for 0.5-20 h;

(IV) After the completion of the step (2-1) while before the beginning of the step (2-2), the obtained product is aged for 1-12 h, and/or dried at a temperature of 60-250 degrees Celsius for 0.5-20 h;

(V) After the completion of the step (2-2) while before the beginning of the step (2-3), the obtained product is optionally aged for 0.5-6 h, dried at a temperature of 70-200 degrees Celsius for 0.5-20 h and calcinated at a temperature of 300-750 degrees Celsius for 0.5-20 h;

(VI) After the completion of the step (2-3), the obtained product is optionally aged for 0.5-6 h, dried at a temperature of 70-200 degrees Celsius for 0.5-20 h and calcinated at a temperature of 300-750 degrees Celsius for 0.5-20 h;

(VII) After the completion of the step (3-1) while before the beginning of the step (3-2), the obtained product is optionally aged for 0.5-8 h, and/or dried at a temperature of 60-250 degrees Celsius for 0.5-20 h;

(VIII) After the completion of the step (3-2) while before the beginning of the step (3-3), the obtained product is optionally aged for 0.5-6 h, dried at a temperature of 70-200 degrees Celsius for 0.5-20 h and calcinated at a temperature of 300-750 degrees Celsius for 0.5-20 h;

(IX) After the completion of the step (3-3) while before the beginning of the step (3-4), the obtained product is aged for 1-12 h, and/or dried at a temperature of 60-250 degrees Celsius for 0.5-20 h;

(X) After the completion of the step (3-4) while before the beginning of the step (3-5), the obtained product is optionally aged for 0.5-6 h, dried at a temperature of 70-200 degrees Celsius for 0.5-20 h and calcinated at a temperature of 300-750 degrees Celsius for 0.5-20 h;

(XI) After the completion of the step (3-5), the obtained product is optionally aged for 0.5-6 h, dried at a temperature of 70-200 degrees Celsius for 0.5-20 h and calcinated at a temperature of 300-750 degrees Celsius for 0.5-20 h;

(XII) After the completion of the step (4-1) while before the beginning of the step (4-2), the obtained product is aged for 1-12 h and/or dried at a temperature of 60-250 degrees Celsius for 0.5-20 h;

(XIII) After the completion of the step (4-2) while before the beginning of the step (4-3), the obtained product is optionally aged for 0.5-6 h, dried at a temperature of 70-200 degrees Celsius for 0.5-20 h and calcinated at a temperature of 300-750 degrees Celsius for 0.5-20 h;

(XIV) After the completion of the step (4-3) while before the beginning of the step (4-4), the obtained product is optionally aged for 0.5-8 h an/or dried at a temperature of 60-250 degrees Celsius for 0.5-20 h;

(XV) After the completion of the step (4-4) while before the beginning of the step (4-5), the obtained product is optionally aged for 0.5-6 h, dried at a temperature of 70-200 degrees Celsius for 0.5-20 h and calcinated at a temperature of 300-750 degrees Celsius for 0.5-20 h;

(XVI) After the completion of the step (4-5), the obtained product is optionally aged for 0.5-6 h, dried at a temperature of 70-200 degrees Celsius for 0.5-20 h and calcinated at a temperature of 300-750 degrees Celsius for 0.5-20 h.

28. The process according to claim 26, wherein the active metal component C comprises Mo, and Mo is supported through a combination of the step (1-2) and the step (1-3), a combination of the step (2-3) and the step (2-2), a combination of the step (3-2) and the step (3-4) or a combination of the step (4-4) and the step (4-2), wherein in the combination, a molar ratio of the amount of Mo to be supported in a preceding step to the amount of Mo to be supported in a succeeding step is 0.4-2.5:1.

29. The process according to claim 26, wherein the carrier is one or more selected from the group consisting of silica, alumina, magnesia, silica-alumina, silica-magnesia and alumina-magnesia;

the organic alcohol is one or more selected from the group consisting of ethylene glycol, propylene glycol, glycerin, pentaerythritol and xylitol;

the adsorbent I is one or more selected from the group consisting of acetic acid, oxalic acid, lactic acid, malonic acid, tartaric acid, malic acid, citric acid, trichloroacetic acid, monochloroacetic acid, mercaptoacetic acid, mercaptopropionic acid, ethylenediamine tetraacetic acid, nitrilotriacetic acid, diaminocyclohexane tetraacetic acid and ammonium salts thereof;

the active metal component B is Co;

the active metal component C is one or more selected from the group consisting of Mo and W; and the auxiliary component is phosphorus.

30. The process according to claim 26, wherein the polyol is polyethylene glycol having a number averaged molecular weight Mn (by the GPC method) of 1000-8000;

the active metal component C is supported through a combination of the step (1-2) and the step (1-3); or the active metal component C is supported through a combination of the step (2-2) and the step (2-3); or the active metal component C is supported through a combination of the step (3-2) and the step (3-4); or the active metal component C is supported through a combination of the step (4-2) and the step (4-4).

* * * * *